Nov. 6, 1951 — C. F. DINLEY — 2,574,251
DRY CLEANING MACHINE
Filed July 3, 1947 — 21 Sheets-Sheet 11
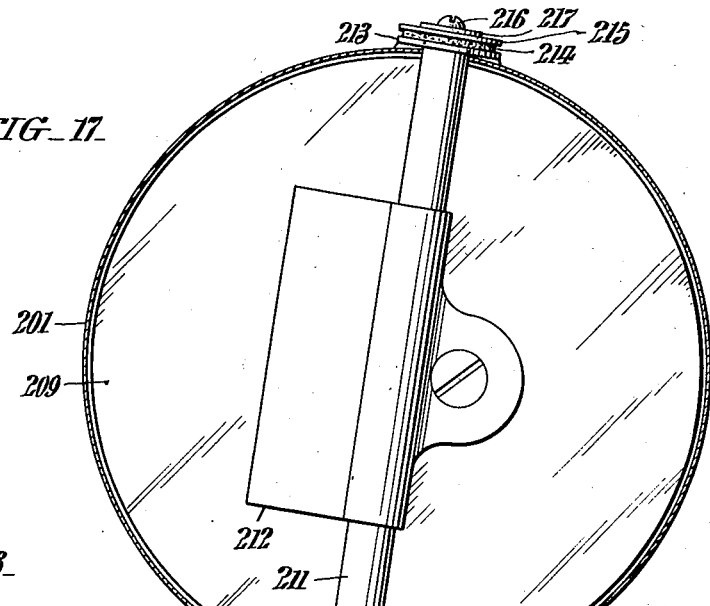
FIG_17
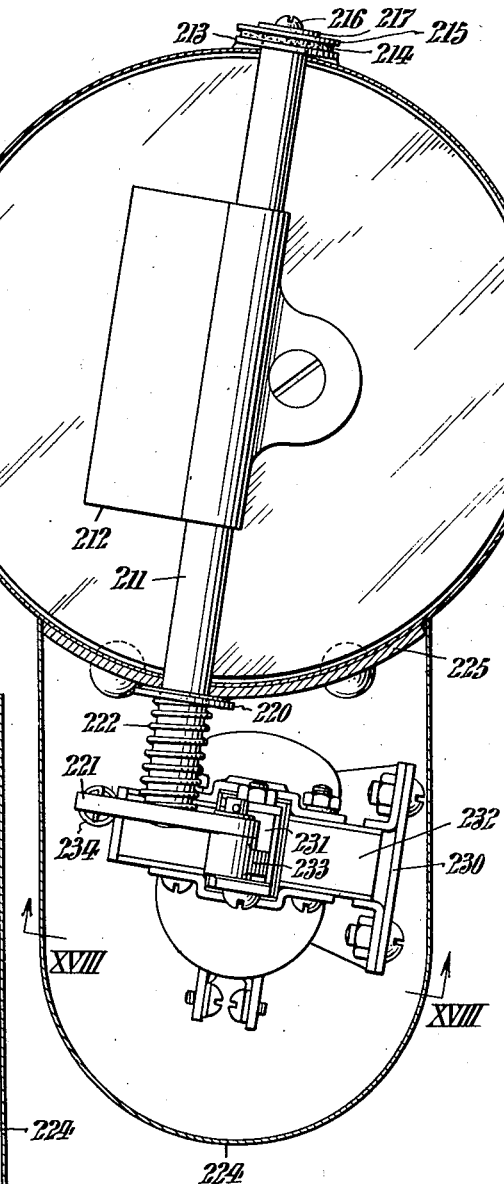
FIG_18
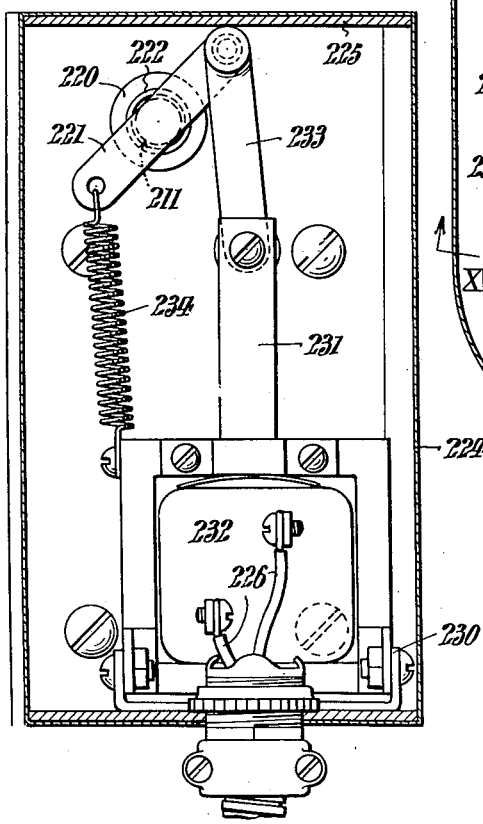
INVENTOR:
Clarence F. Dinley,
BY Paul & Paul
ATTORNEYS.

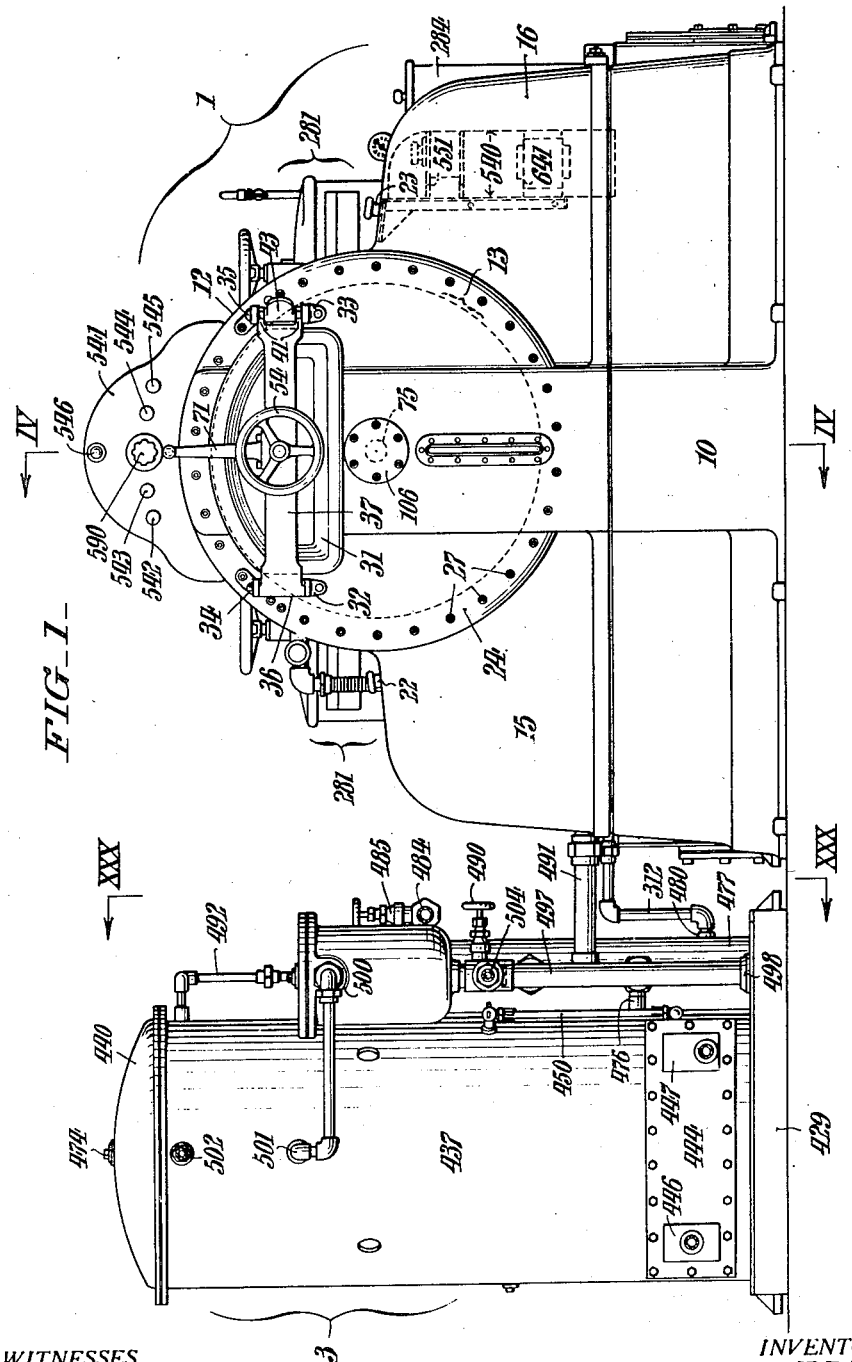

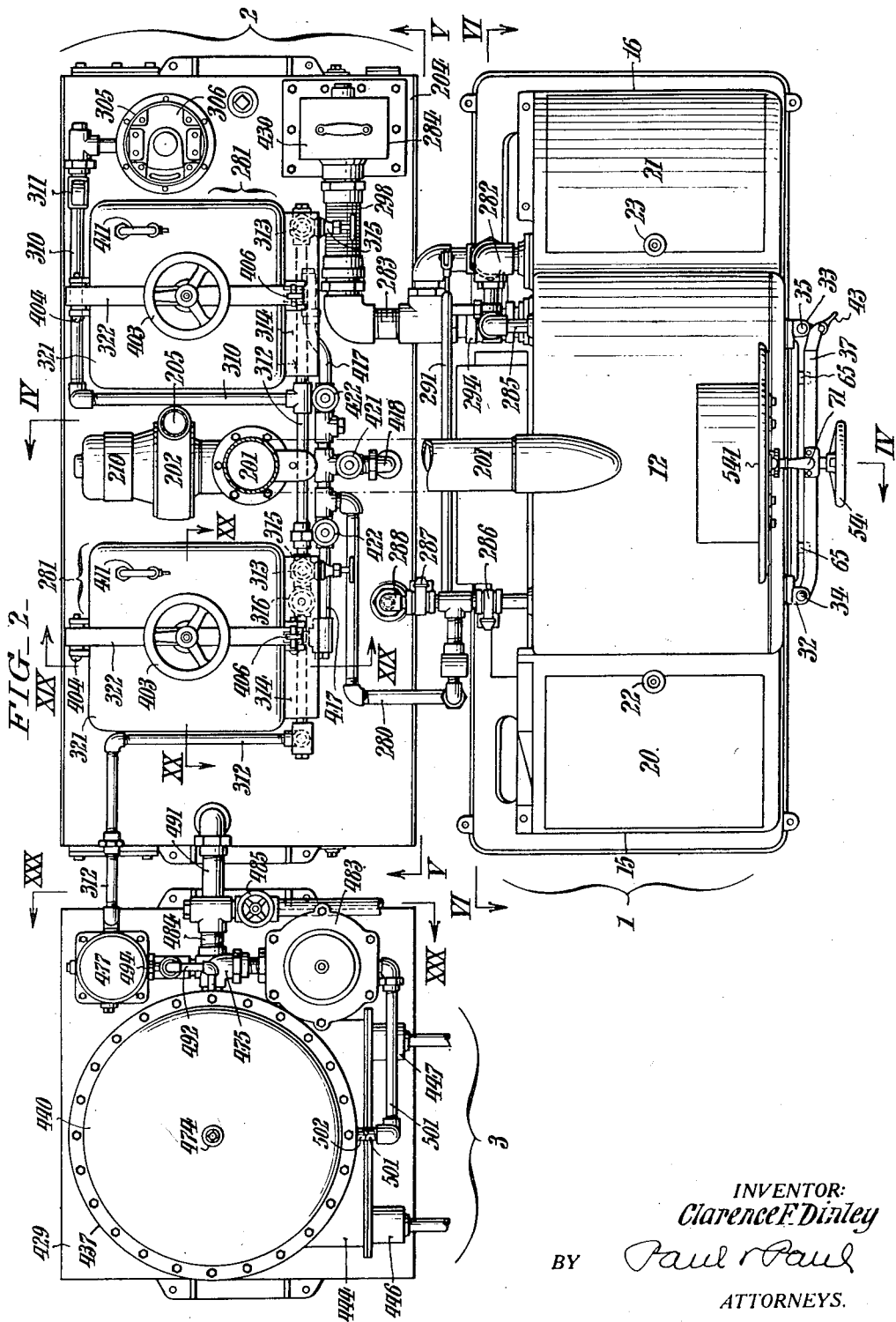

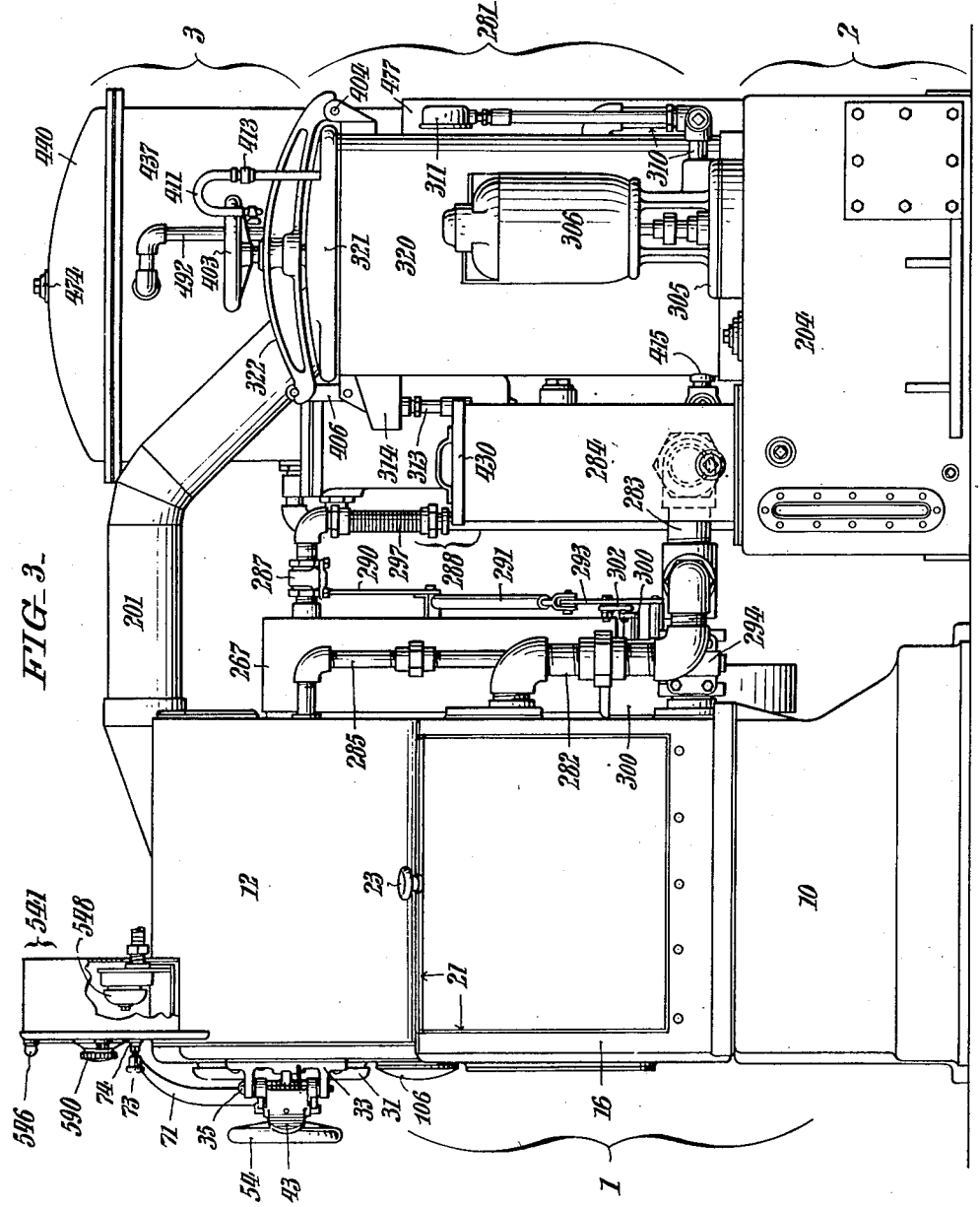

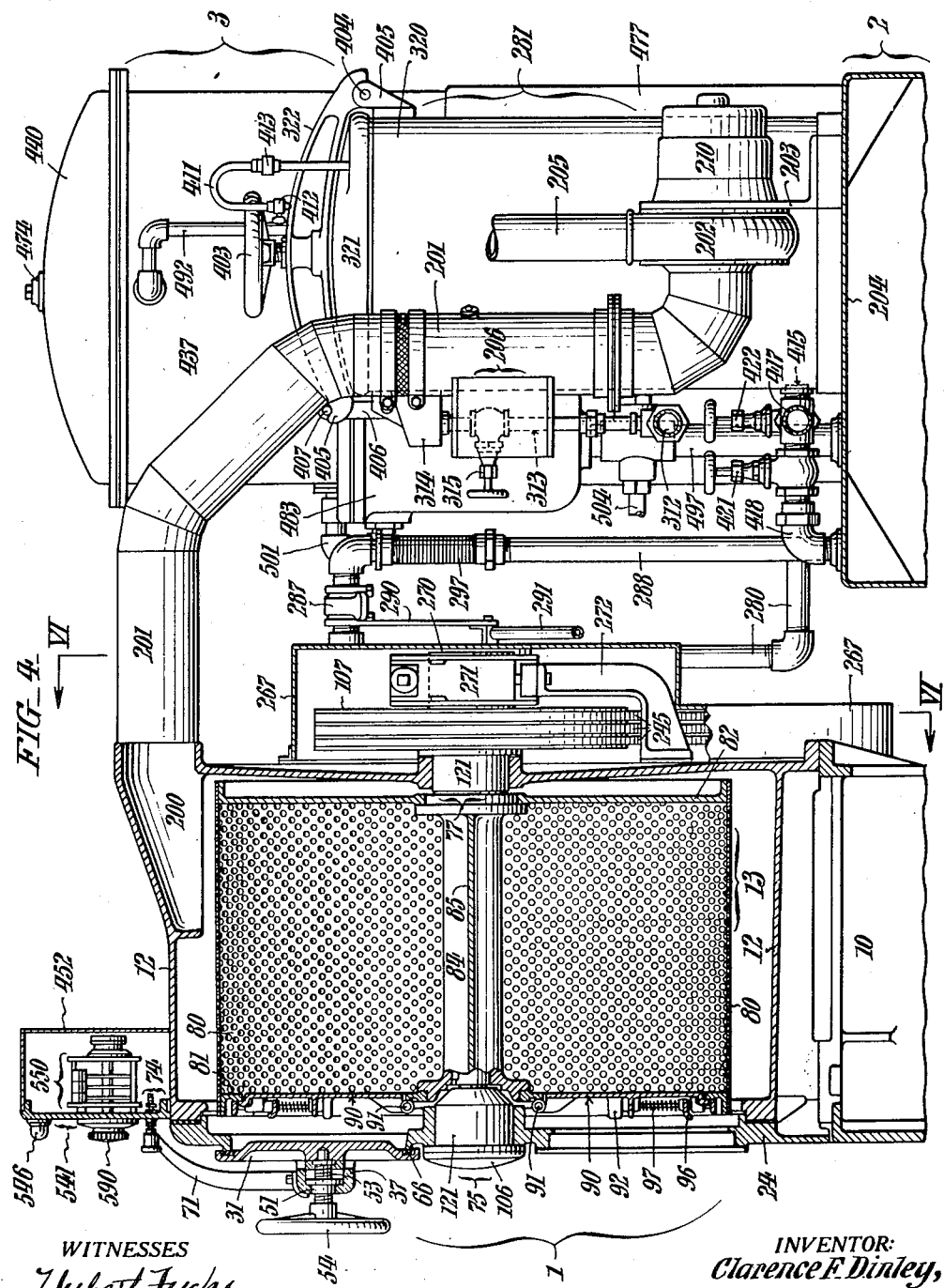

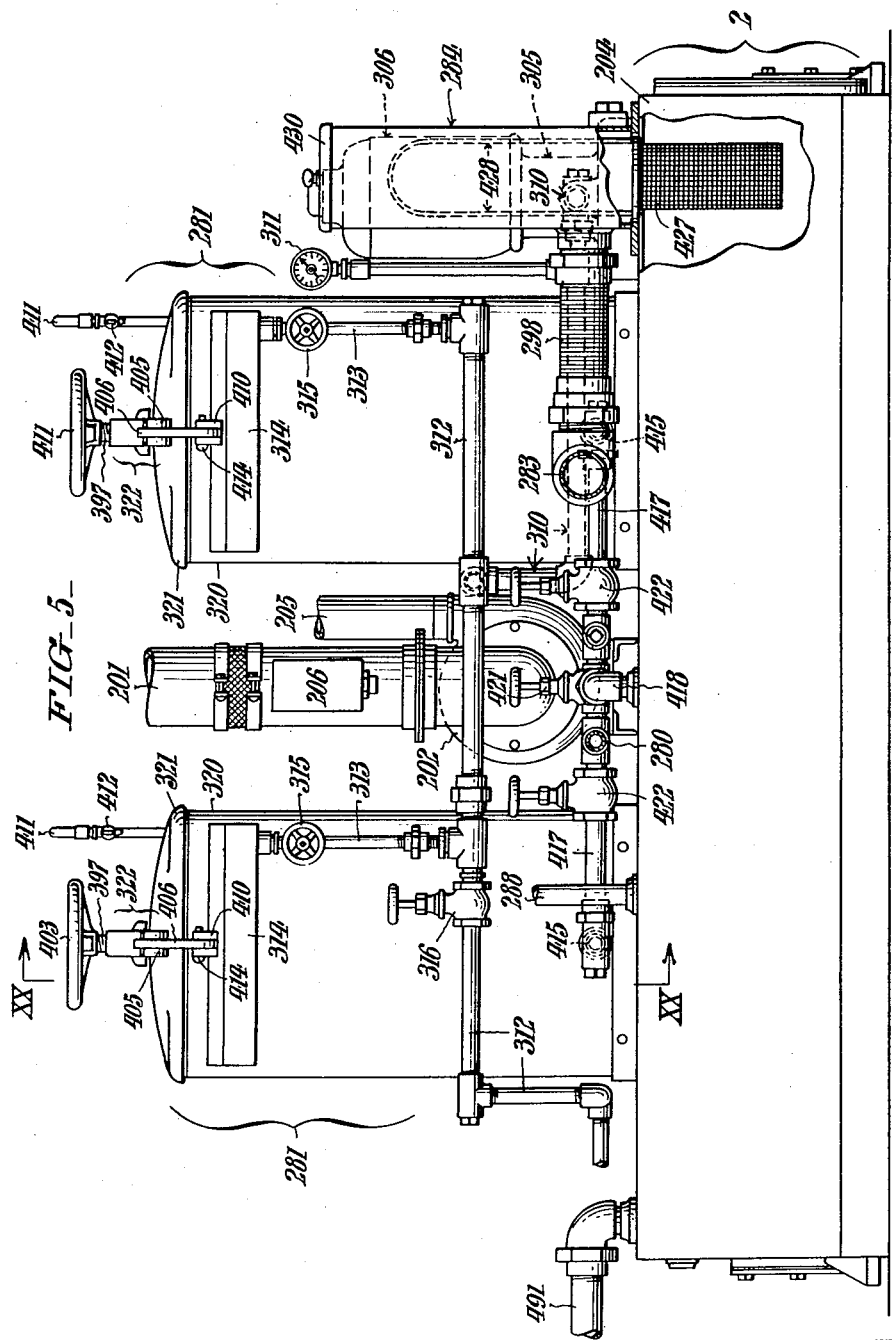

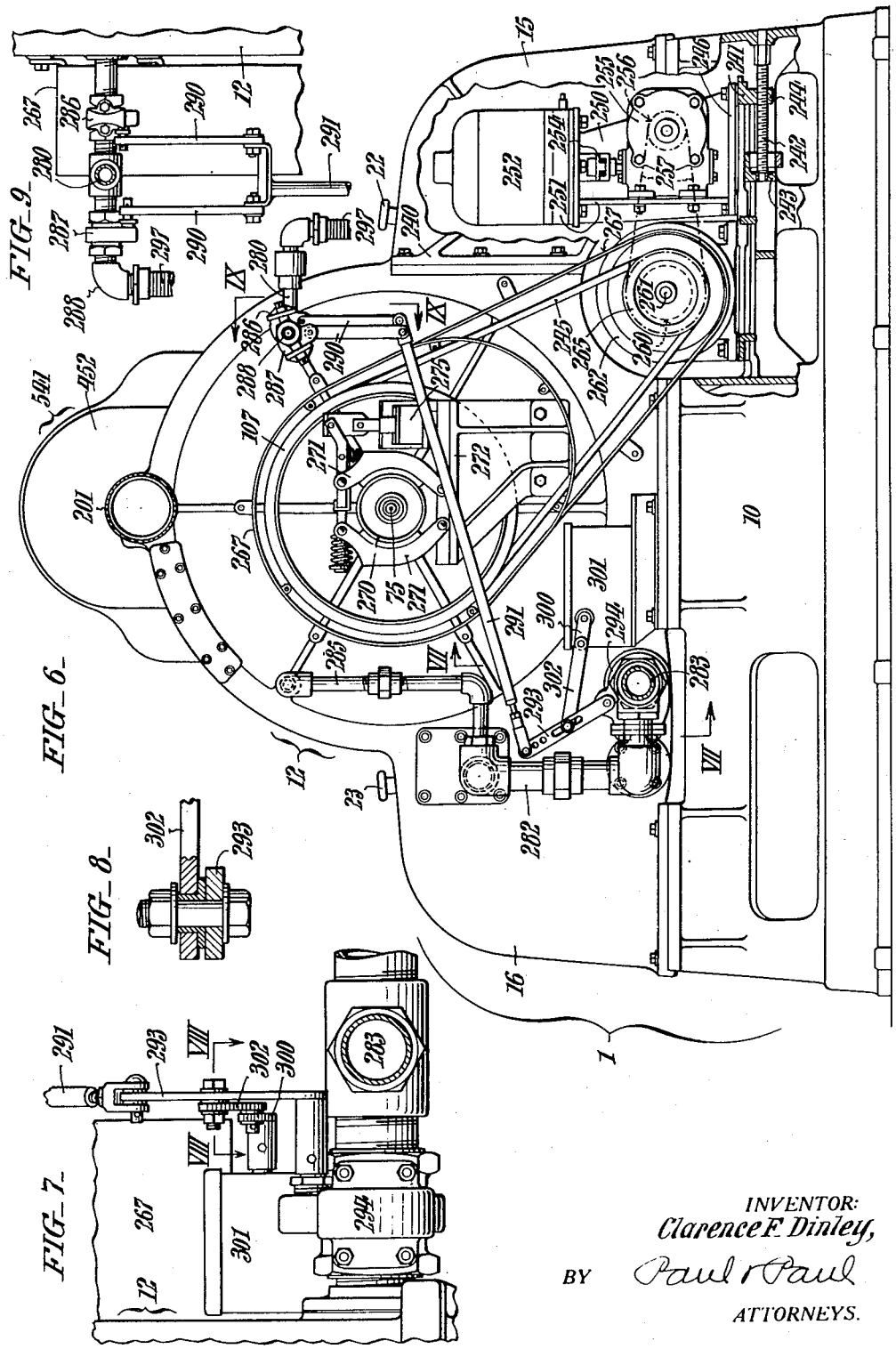

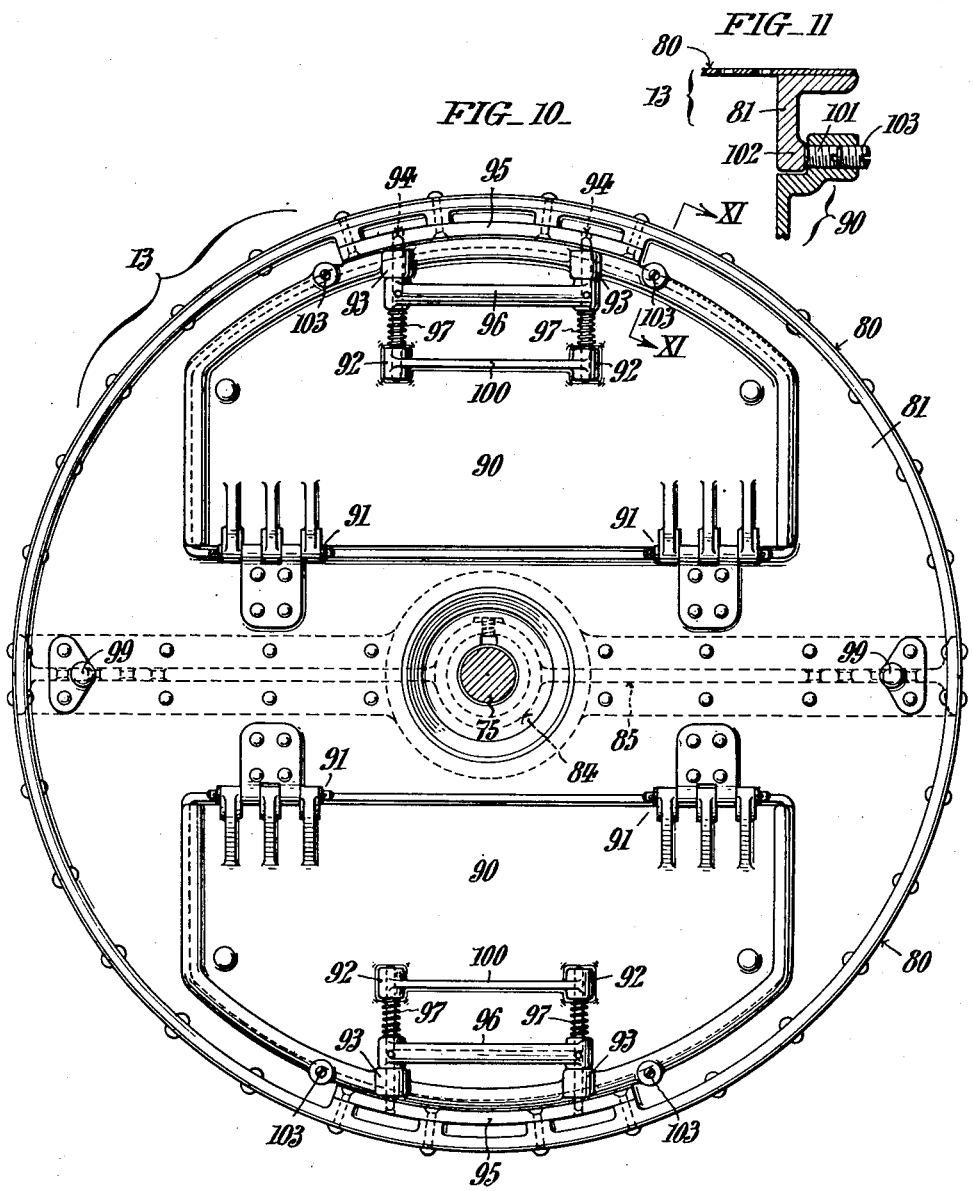

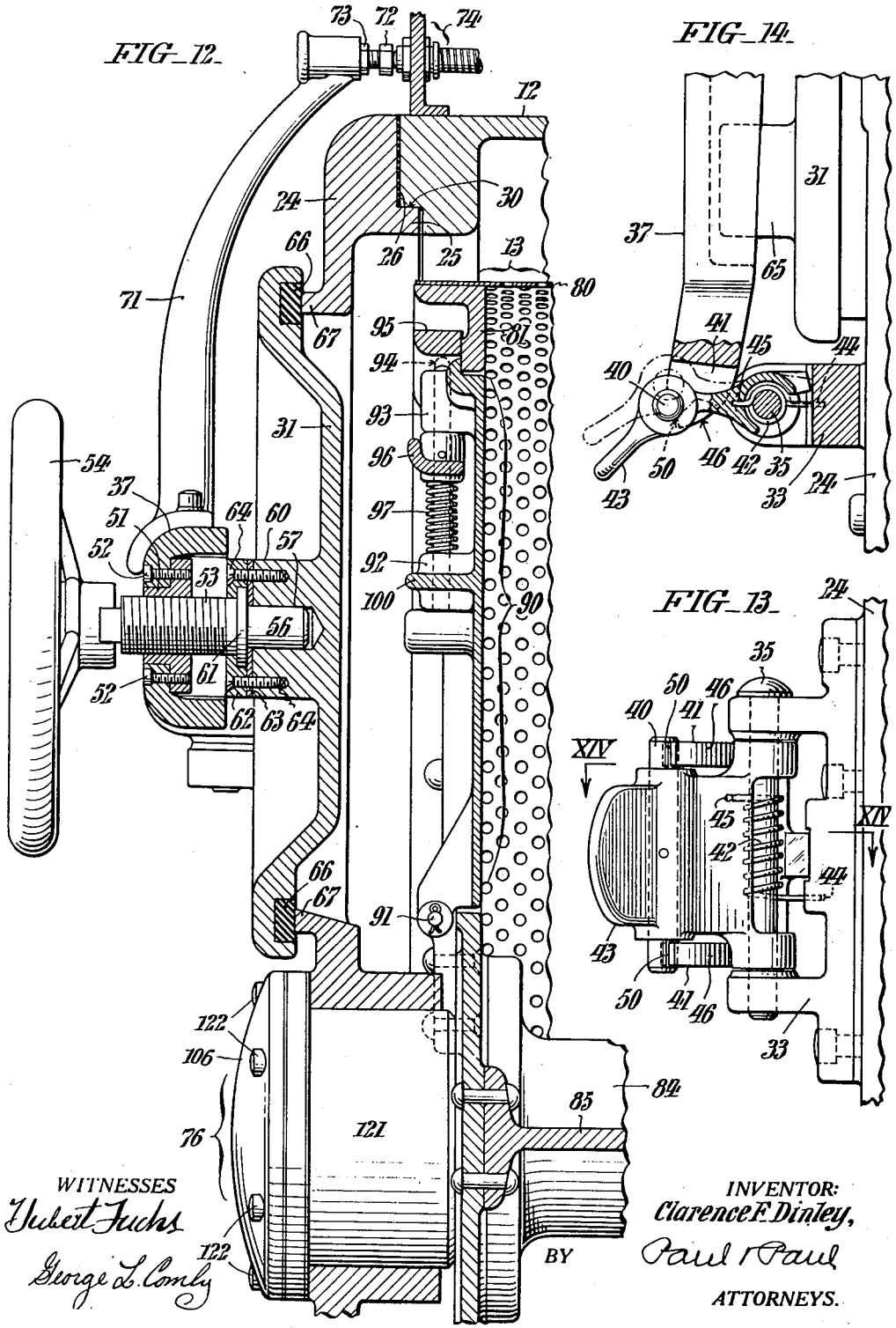

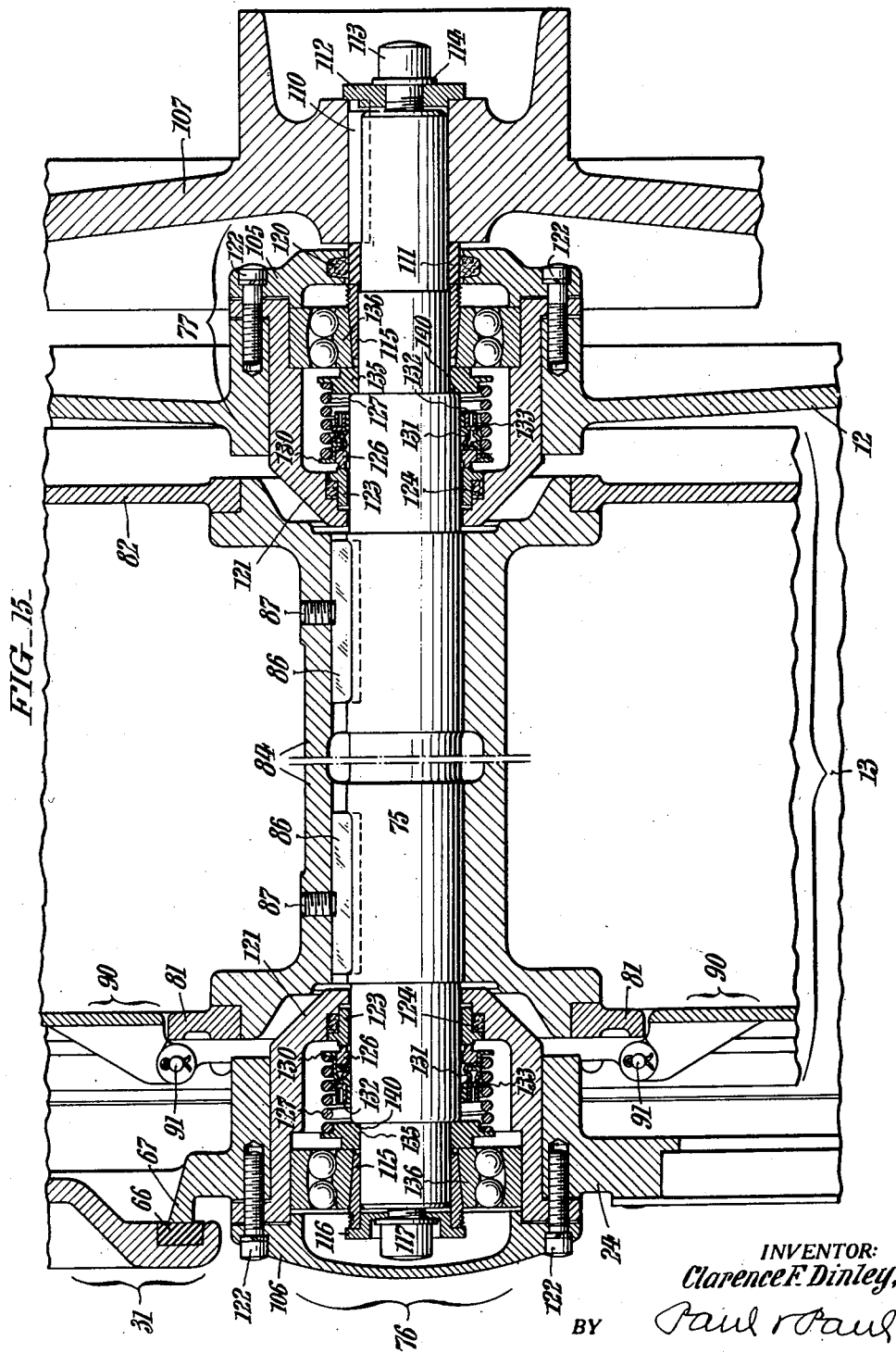

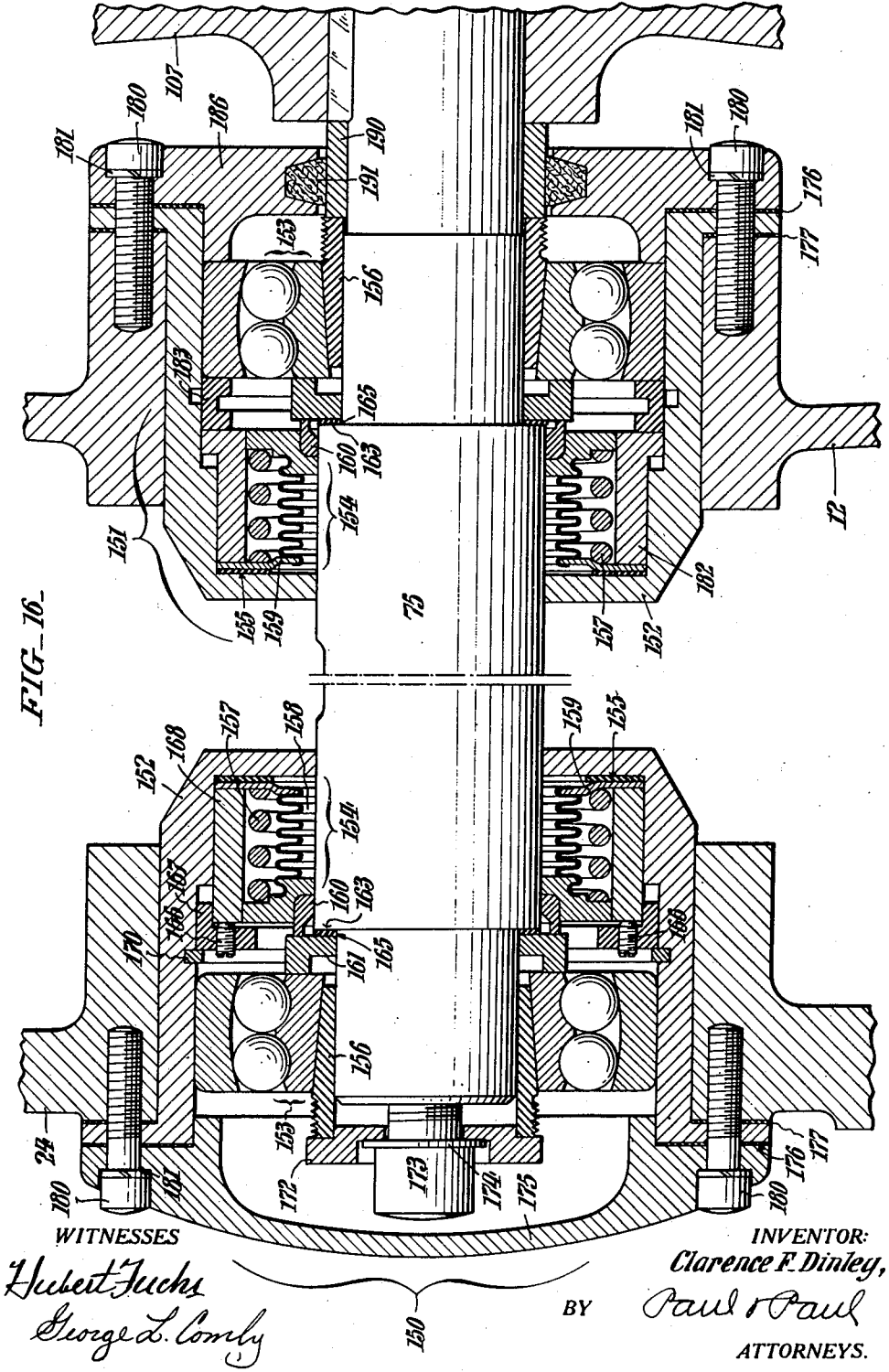

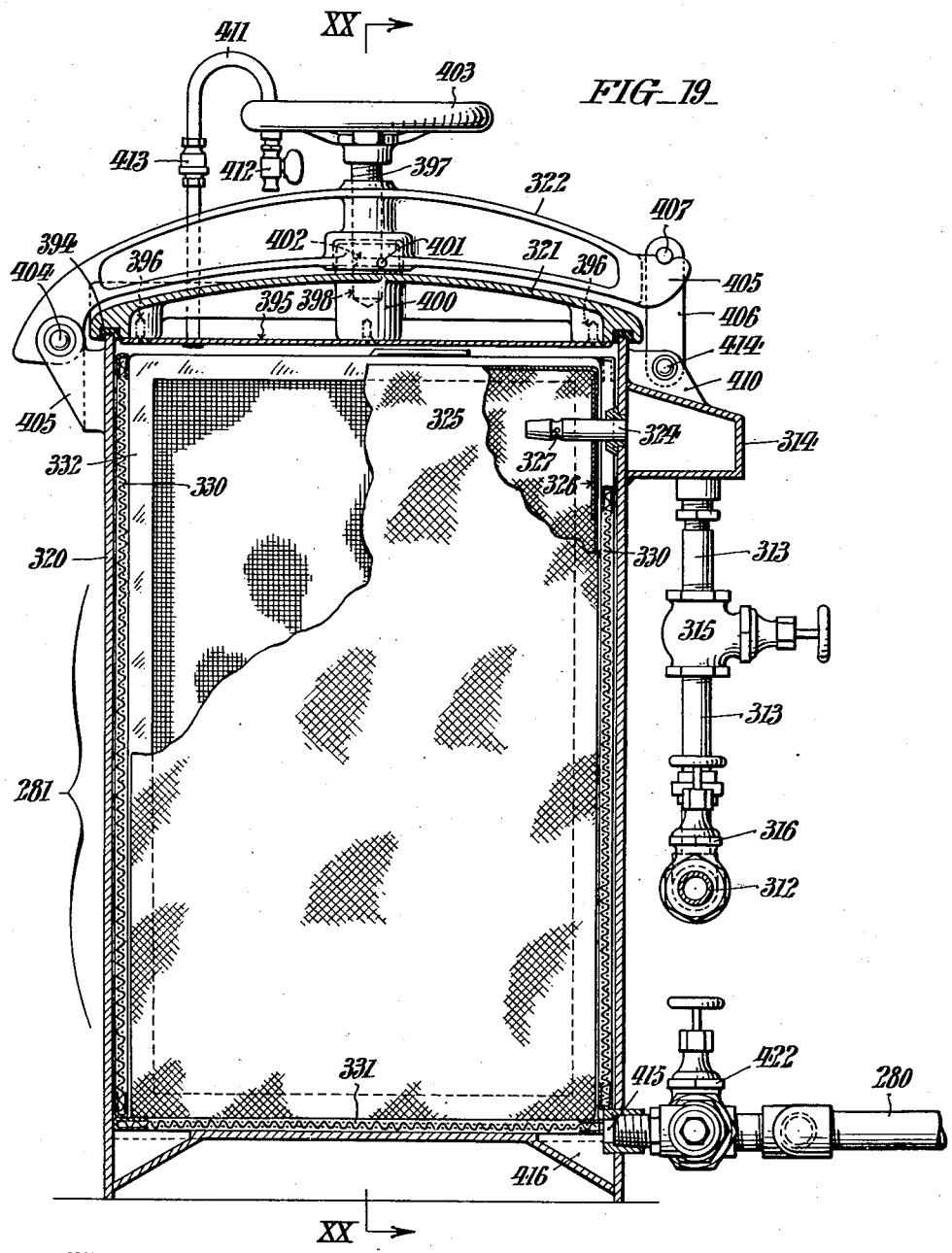

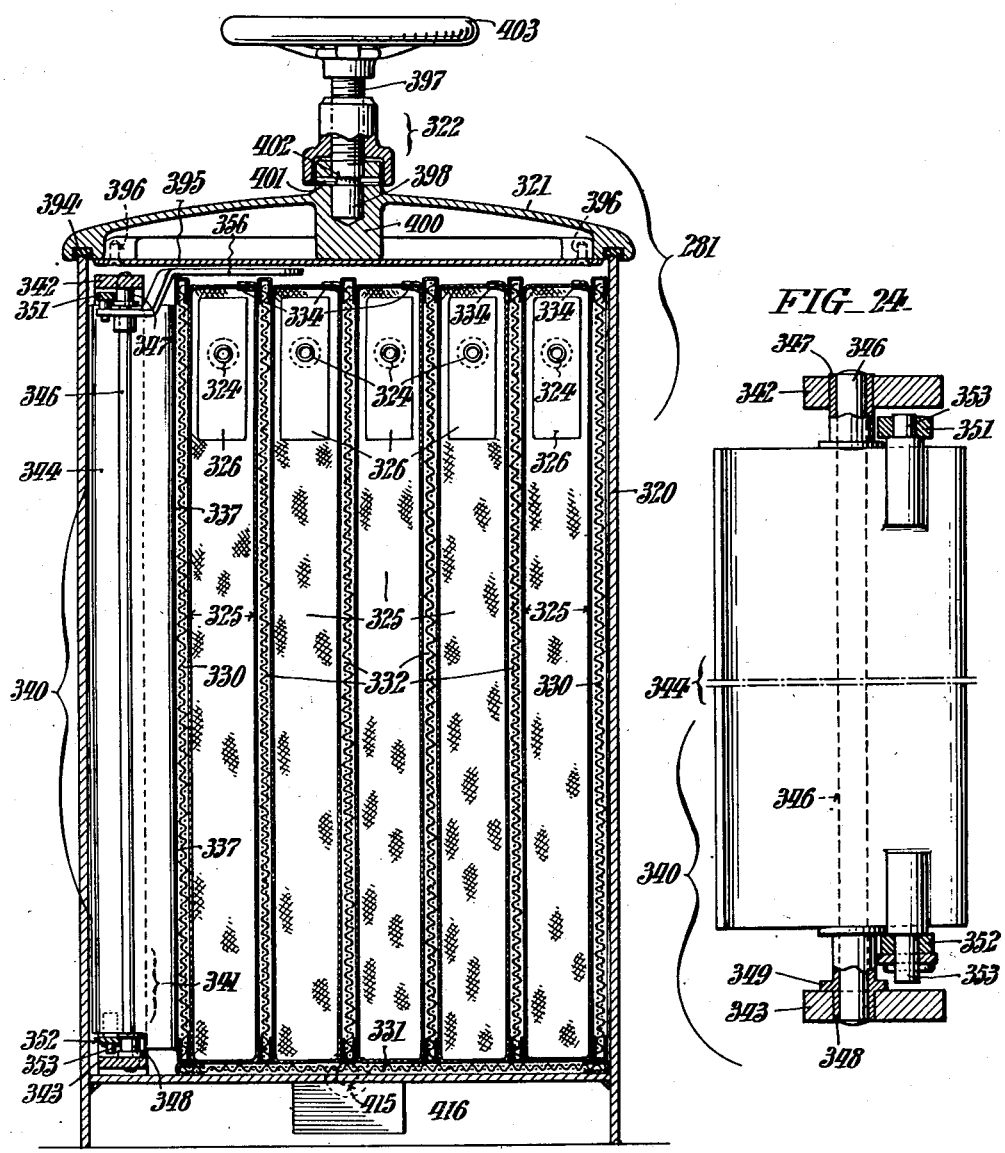

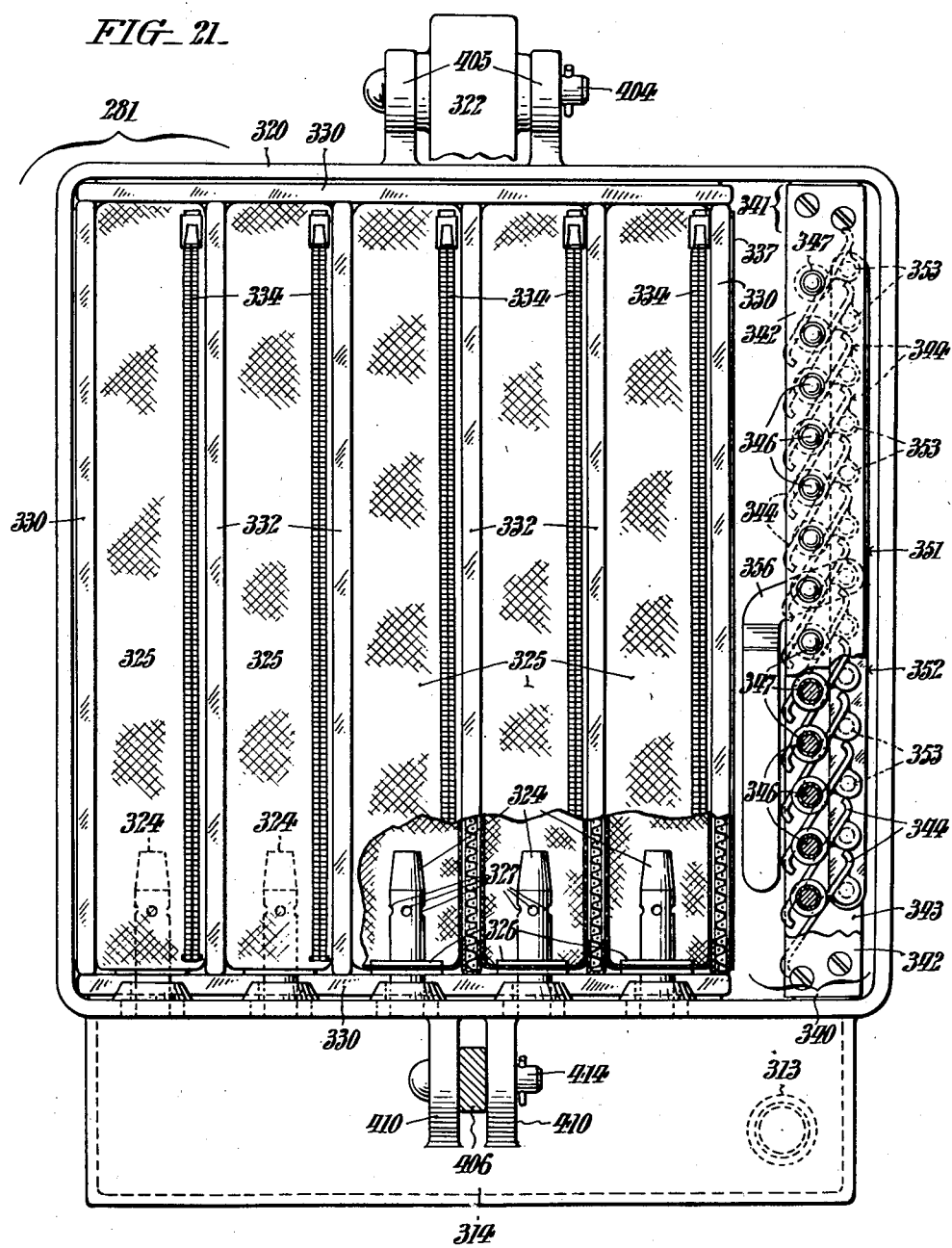

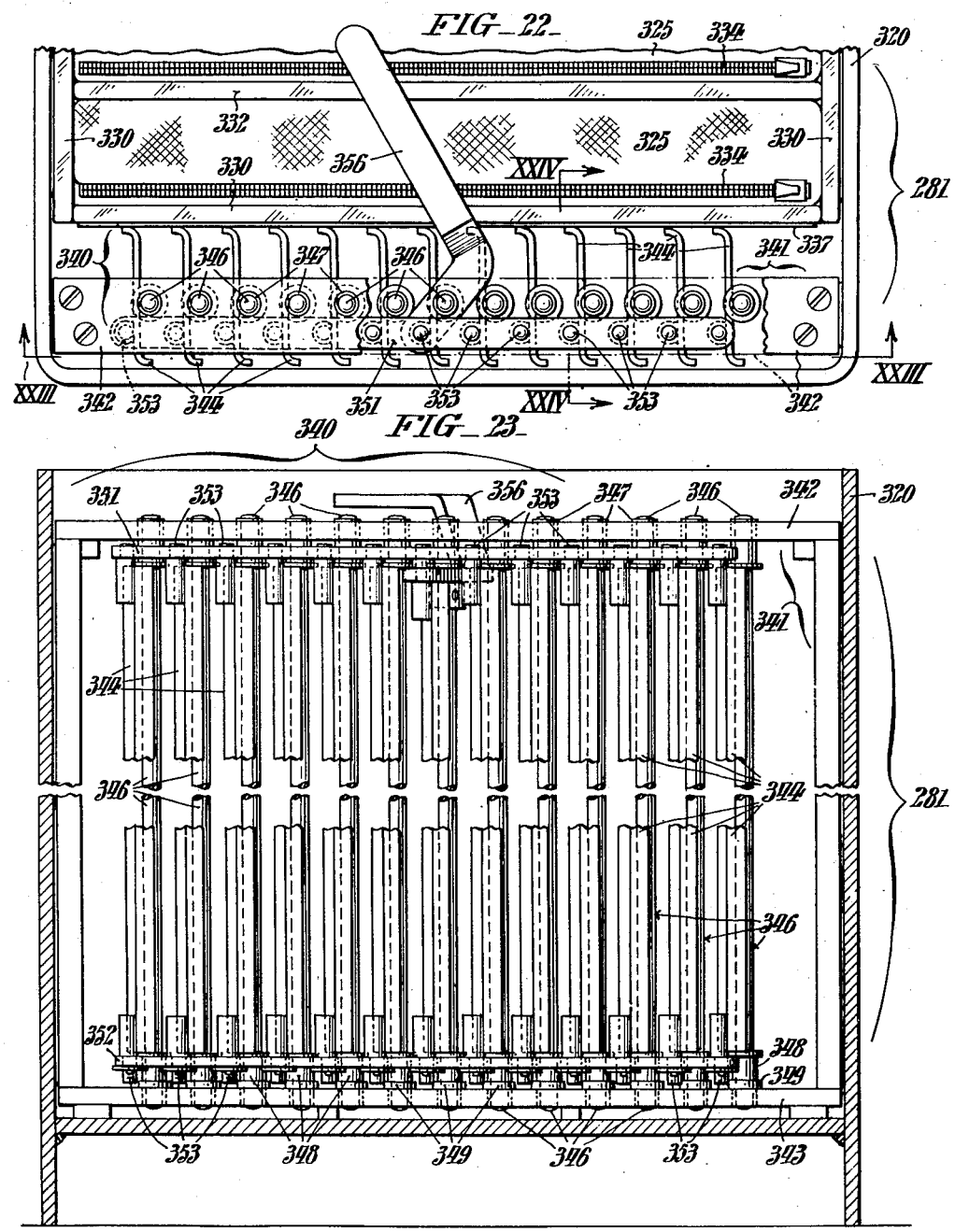

Nov. 6, 1951  C. F. DINLEY  2,574,251
DRY CLEANING MACHINE
Filed July 3, 1947  21 Sheets-Sheet 16
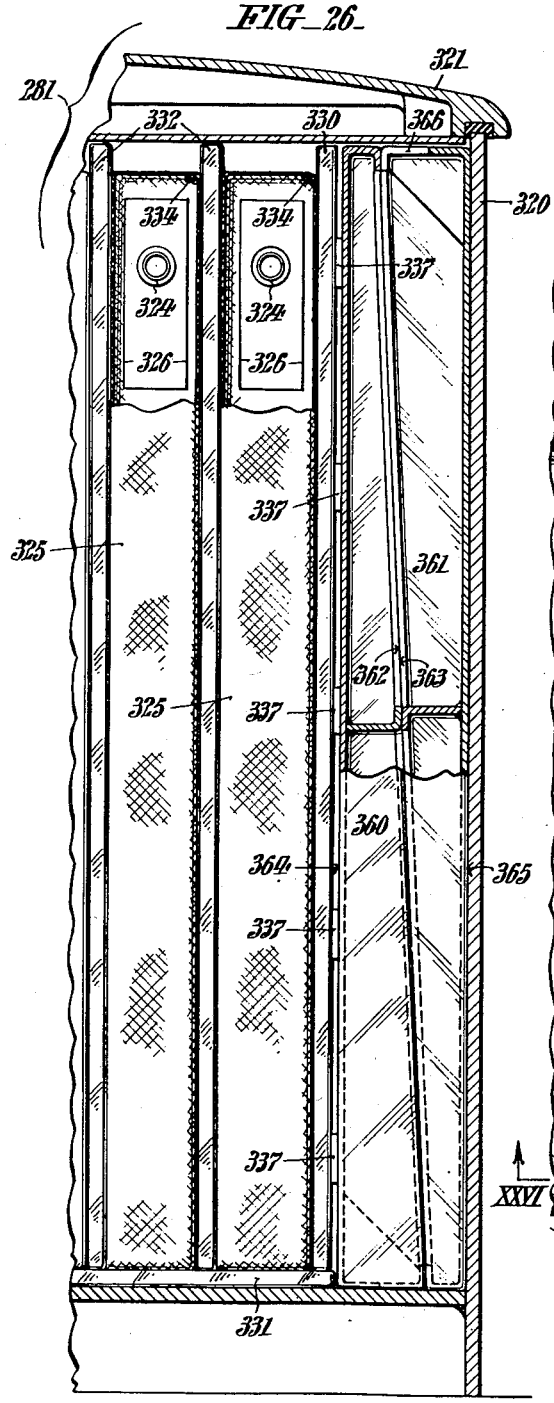
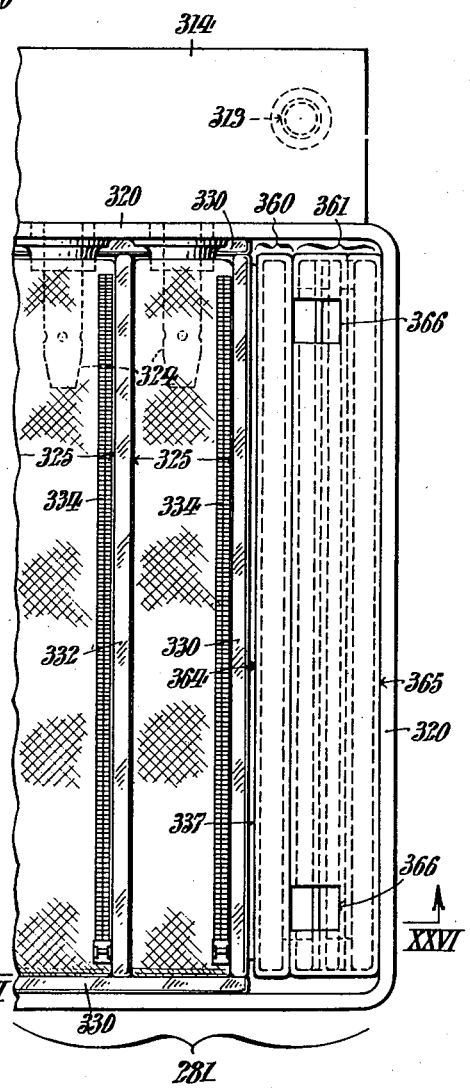
INVENTOR:
Clarence F. Dinley,
BY Paul & Paul
ATTORNEYS.

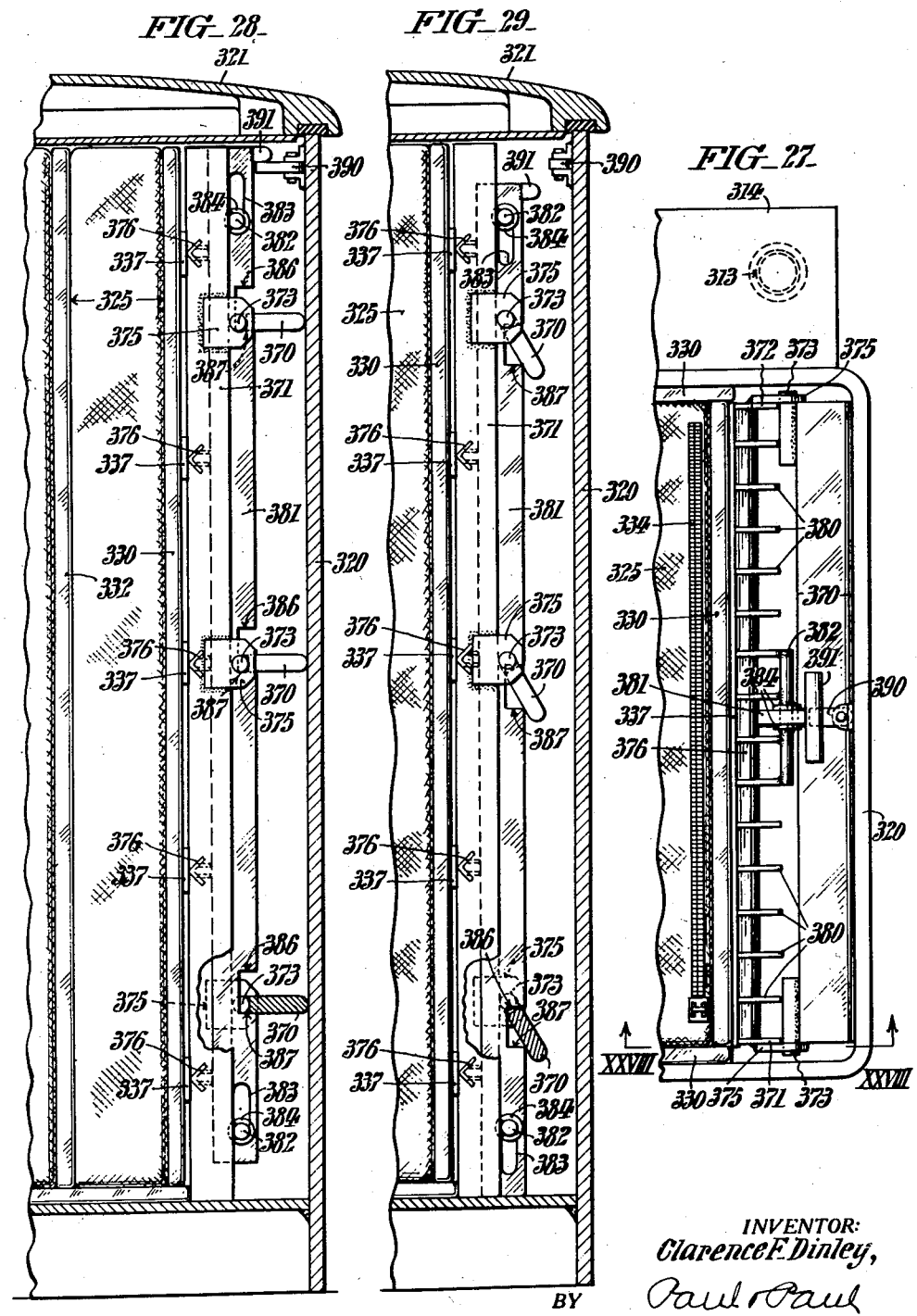

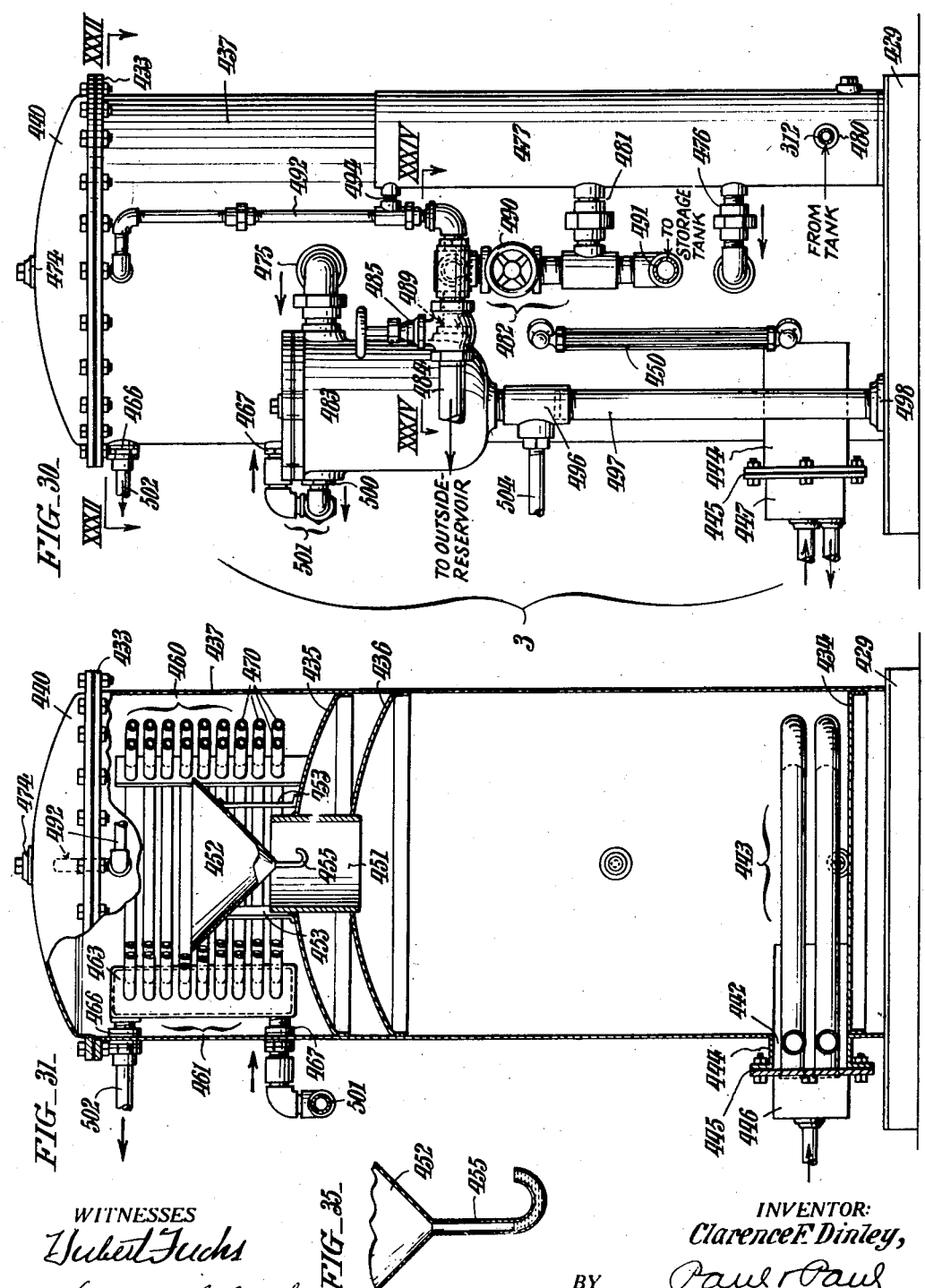

Nov. 6, 1951 — C. F. DINLEY — 2,574,251
DRY CLEANING MACHINE
Filed July 3, 1947 — 21 Sheets-Sheet 19
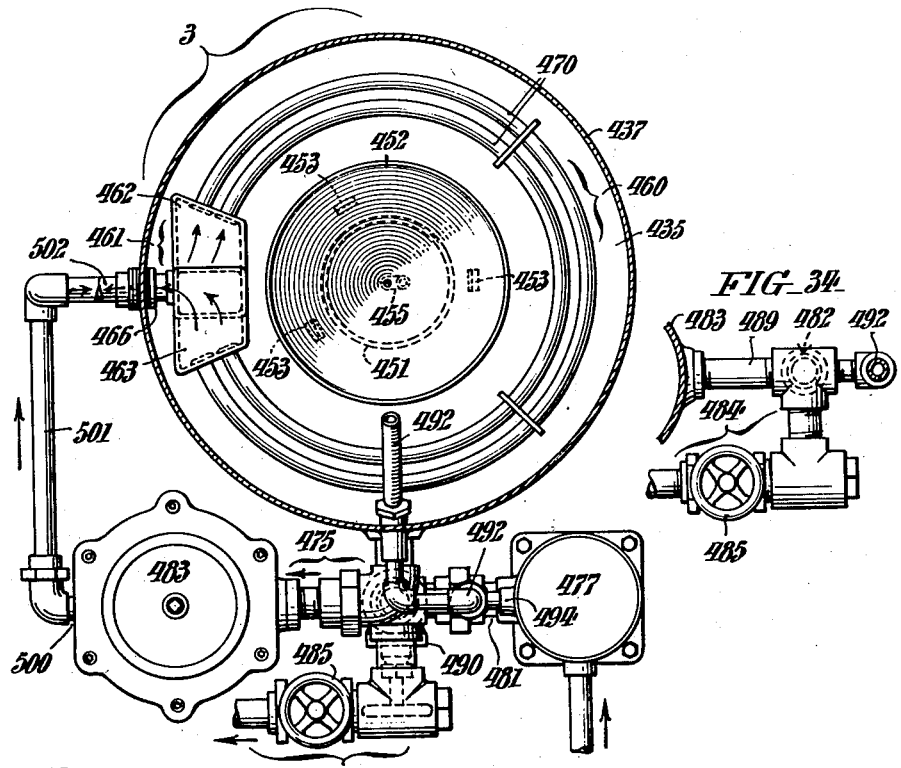
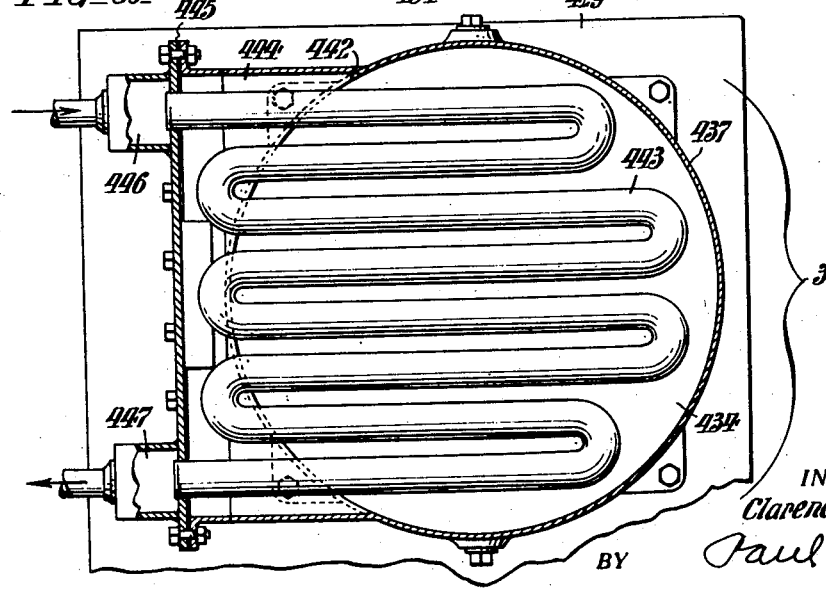
INVENTOR:
Clarence F. Dinley,
BY Paul & Paul
ATTORNEYS.

Nov. 6, 1951 — C. F. DINLEY — 2,574,251
DRY CLEANING MACHINE
Filed July 3, 1947 — 21 Sheets-Sheet 20
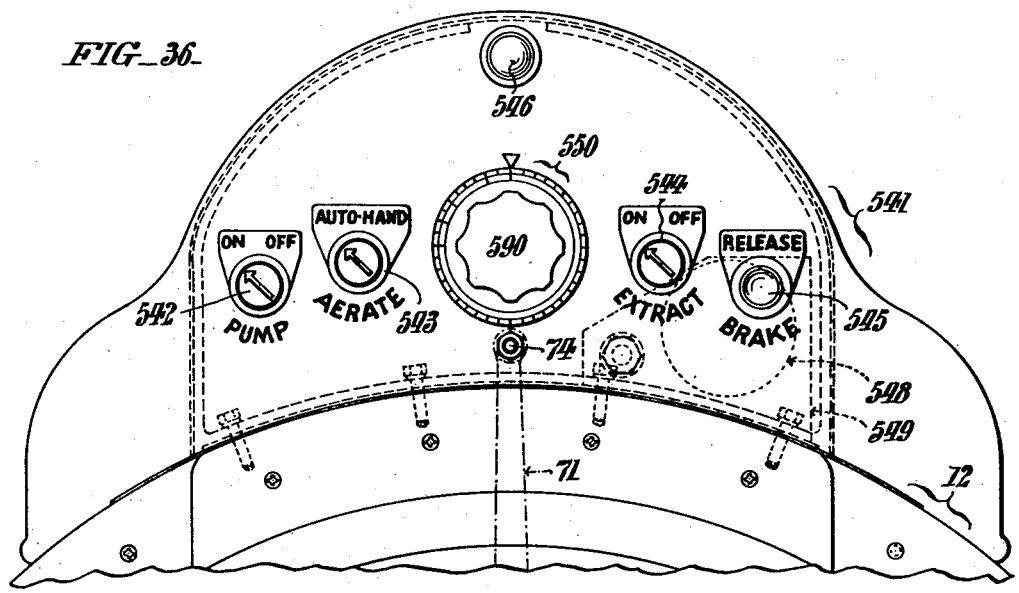
FIG_36_
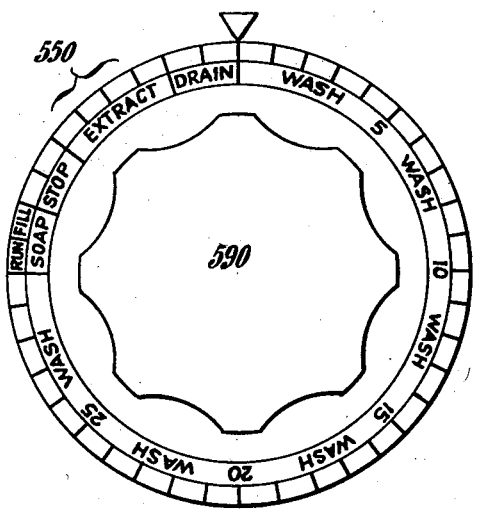
FIG_37_
WITNESSES:
Hubert Fuchs
George L. Comly
INVENTOR:
Clarence F. Dinley,
BY Paul & Paul
ATTORNEYS.

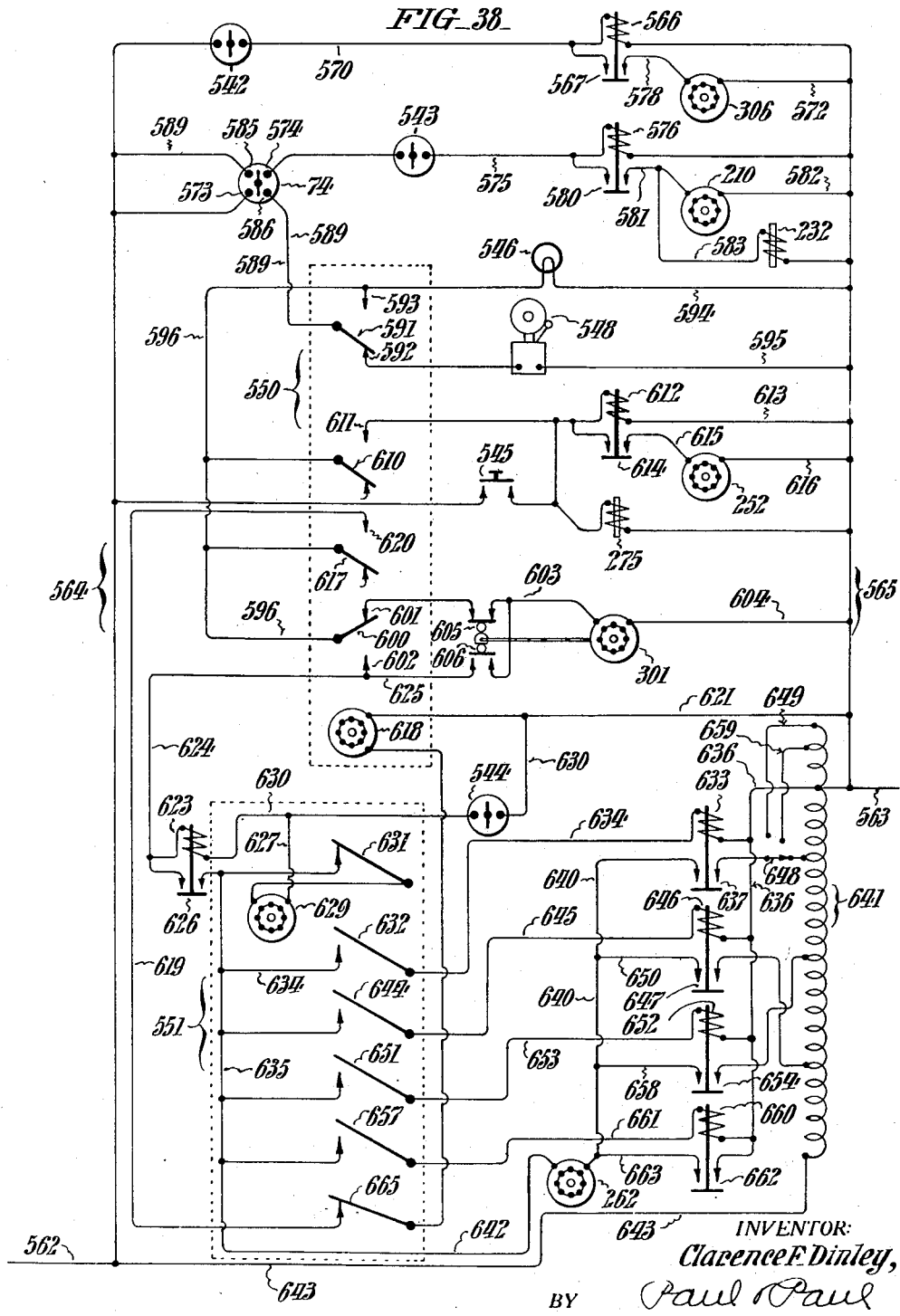
FIG_38_

Patented Nov. 6, 1951

2,574,251

UNITED STATES PATENT OFFICE 2,574,251

DRY CLEANING MACHINE

Clarence F. Dinley, Detroit, Mich., assignor to Detrex Corporation, Detroit, Mich., a corporation of Michigan Application July 3, 1947, Serial No. 758,888

12 Claims. (Cl. 68—18)

My invention relates to dry cleaning machines. More specifically my invention pertains to a dry cleaning machine which is structurally simple and rugged, protects the cleaning solvent from contamination, and has great flexibility of operation coupled with automatic controls for following predetermined methods of operation. Accordingly one object of this invention is the provision of a dry cleaning machine in which the cleaning solvent is protected from contamination by sealed bearings, filtering means, condensing means and the like integrated in the machine unit. Another object of this invention is the provision of an automatic control which makes it possible with this invention to automatically perform a washing and solvent extraction cycle which ends with audible and visual indications of the completion of the cycle.

Another object of this invention is the provision of a unitary dry cleaning machine which is capable of performing a complete cleaning cycle and includes means for conditioning the solvent economically and efficiently. In this invention the solvent is continuously subjected to an improved filtering operation and also to a straining operation for the removal of buttons, lint and other foreign matter. The solvent is further subjected to a periodic purification by an improved evaporation process. Thus the solvent is kept in proper condition for efficient cleaning without a frequent and expensive replacement of solvent.

Still another object of this invention is the provision of a dry cleaning machine which will automatically perform a dry cleaning method which includes the step of gradual acceleration of a rotating drum carrying the material being cleaned until a high speed is reached in the extraction of the cleaning solvent. This step is important because it permits the materials being cleaned to adjust themselves to a new center of gravity gradually and in preparation for high speed rotation.

A still further object of my invention is the provision of a dry cleaning machine having a rotating drum carried by sealed bearings which prevent the contamination of the solvent by lubrication from the bearings. It is also important to keep the solvent from entering into the bearings of the rotating drum.

A further object of this invention is the provision of a dry cleaning machine which does not subject the operator to fumes of the cleaning solvent when the machine is open as for loading or unloading.

Still further objects and advantages of this invention will become apparent from the following detailed description of a preferred embodiment thereof which is shown in the accompanying drawings.

Fig. 1 is a front elevation of a preferred form of the invention.

Fig. 2 is a plan view of the invention shown in Fig. 1.

Fig. 3 is a side view of the invention seen from the right of Figs. 1 and 2.

Fig. 4 is a partial vertical section taken as indicated by the arrows IV—IV in Figs. 1 and 2.

Fig. 5 is a vertical section taken as indicated by the arrows V—V in Fig. 2.

Fig. 6 is a vertical section taken as indicated by the arrows VI—VI in Figs. 2 and 4.

Fig. 7 is a fragmentary sectional view of the drain valve and the linkage controlling its operation taken as indicated by the arrows VII—VII in Fig. 6.

Fig. 8 is a fragmentary sectional view taken as indicated by the arrows VIII—VIII in Fig. 7.

Fig. 9 is a fragmentary sectional view of the inlet and by-pass valve with their associated control levers taken as indicated by the arrows IX—IX in Fig. 6.

Fig. 10 is a front elevational view of the front face member of the rotatable drum showing the twin doors thereof.

Fig. 11 is a fragmentary sectional view taken as indicated by the arrows XI—XI in Fig. 10.

Fig. 12 shows a partial vertical section of the upper front portion of the tub housing including a portion of the drum and showing the detail of the doors of the drum and the tub housing.

Fig. 13 shows an end view of the latch means for locking the door of the tub housing.

Fig. 14 is a sectional plan view of the latch means shown in Fig. 13 and taken as indicated by the arrows XIV—XIV in Fig. 13.

Fig. 15 shows a fragmentary vertical section of the sealed bearings mounted in the tub housing with the drum supported therein.

Fig. 16 shows a modified form of sealed bearings under the preferred form shown in Fig. 15.

Fig. 17 is a transverse sectional view showing the damper and electrically operating mechanism associated therewith.

Fig. 18 is a sectional view taken as indicated by the arrows XVIII—XVIII in Fig. 17.

Fig. 19 is a vertical section showing the construction of a filter and taken as indicated by the arrows XIX—XIX in Fig. 2.

Fig. 20 is a vertical sectional view of a filter taken as indicated by the arrows XX—XX in Figs. 2, 5 and 19.

Fig. 21 is a plan view of a filter with the cover removed and some parts in section.

Fig. 22 is a view like Fig. 21 showing the gate mechanism extended.

Fig. 23 is a fragmented vertical section taken as indicated by the arrows XXIII—XXIII in Fig. 22.

Fig. 24 is a fragmented vertical section taken as indicated by the arrows XXIV—XXIV in Fig. 22.

Fig. 25 is a partial plan view of a filter with the cover removed showing a modified form of spacer means.

Fig. 26 is a partial vertical sectional view taken as indicated by the arrows XXVI—XXVI in Fig. 25.

Fig. 27 is a partial top view of a filter with the cover removed showing a modified form of spacer gate.

Fig. 28 is a sectional view taken as indicated by the arrows XXVIII—XXVIII in Fig. 27.

Fig. 29 is a sectional view similar to Fig. 28 but showing the spacing means in the collapsed position.

Fig. 30 is a side elevational view of the condenser taken as indicated by the arrows XXX—XXX in Figs. 1 and 2.

Fig. 31 is a partial vertical sectional view showing the internal details of the condenser shown in Fig. 30.

Fig. 32 is a horizontal sectional view taken as indicated by the arrows XXXII—XXXII in Fig. 30.

Fig. 33 is a transverse sectional view showing the steam coil unit in the condenser shown in Fig. 30.

Fig. 34 is a partial sectional view taken as indicated by the arrows XXXIV—XXXIV in Fig. 30.

Fig. 35 is a vertical sectional view of the J-tube shown in Fig. 31.

Fig. 36 is a front elevation view of the control bracket mounted on top of the tub housing.

Fig. 37 is a front view of the operating dial of the timer shown in Fig. 36.

Fig. 38 is a schematic showing of the electrical operating and control circuits pertaining to the invention.

In describing the preferred embodiment of the invention and the modifications thereof illustrated in the drawings, a specific terminology will be employed for the sake of clarity. However, it is to be understood that there is no intention of being limited thereby to the specific terms so selected but on the contrary, each specific term is intended to include all technical equivalents which operate in a similar manner to accomplish a similar purpose.

Preliminary analysis

The operative principle of this invention involves the agitation of the material to be cleaned in a cleaning solvent such as carbon tetrachloride, trichlorethylene, perchlorethylene and like solvents well known to the art, the extraction of the solvent from the cleaned material and the conditioning of the solvent for efficient and economic cleaning. In order to perform a cleaning operation of this type, the apparatus here described consists in a cleaning unit comprehensively designated as 1, a solvent supply unit including solvent tank and filtering means comprehensively designated as 2 and a distillation unit comprehensively designated as 3, see Figs. 1 and 2. In the regular cycle of operation the cleaning solvent stored and filtered by supply unit 2, flows from unit 2 through the cleaning unit 1 and back to unit 2. Periodic re-conditioning of the solvent is effected by circulating solvent through the distillation unit 3 and back to the supply unit 2.

The cleaning unit generally

The cleaning unit 1 consists of a rugged machine base 10 which supports a tub housing 12 in which a perforated drum comprehensively designated 13 is rotatably mounted. The tub housing 12 is formed integrally with two compartments 15 and 16 on each side thereof for housing motors and control equipment as will be explained in detail later. These compartments 15 and 16 are provided with hinged access doors 20 and 21 (Fig. 2) having operating handles 22 and 23. The tub housing 12 is provided with a removable front face 24 held in place by cap screws 27. In order to provide a solvent tight joint the front face 24 is formed with a flange 25 and the tub housing 12 is formed correspondingly with a recess 30 to receive the flange 25, a gasket 26 being provided between the flange 25 and the recess 30. See Fig. 12.

The outer door of the cleaning unit

An outer door 31 is provided in the front face 24 of the tub housing 12. The door 31 is supported by a door yoke 37 which in turn is supported with capacity for hinged movement by bracket 32 mounted on front face 24. See Figs. 12, 13 and 14. The bracket 32 has a hinge pin 34 (see Fig. 1) which passes through a bearing sleeve 36 formed in one end of the door yoke 37. The other end of the door yoke 37 is formed with bifurcations 41 which coact with the ends of latch pin 40 mounted in latch member 43. The latch member 43 is mounted on bracket 33 by means of hinge pin 35 as shown in Figs. 13 and 14. A helical spring 42 extends around the hinge pin 35 and has one end anchored in the bracket 33 at 44 and the other end anchored in the latch member 43 at 45 so that the latch member 43 with its latch pin 40 is spring-urged toward and into locking engagement with the bifurcations 41 of the yoke 37. In order to disengage the latch member 43 from the bifurcations 41 of the door yoke 37, it is necessary to move the latch member 43 away from the bifurcations 41 and against the spring pressure exerted thereon by the spring 42. As appears in Figs. 13 and 14 the bifurcations 41 are rounded on the inner side at 46 and have notches 50 formed on the outside to accommodate the latch pin 40. In closing the door 31, the curved surfaces 46 urge the latch member 43 back and finally the spring 42 urges the latch member 43 into locking relation with the bifurcations 41, the latch pin 40 then being seated in the rounded notches 50.

A threaded flange nut 51 (see Fig. 12) is mounted in an opening in the center of the door yoke 37 and held in place by means of screws 52. A threaded axle member 53 is held in threaded engagement by the threaded flange nut 51. Mounted on the outer end of axle member 53 is an operating hand wheel 54. The inner end of the axle member 53 is rotatably mounted on the door 31. The inner end of the axle member 53 is formed into a journal 56 which projects into a bearing 57 formed in a pedestal 60 formed on the door 31. The journal 56 is held in its bearing 57 by means of a flange 61 formed between the outer end of the journal 56 and the inner end of the threaded portion of the axle member 53. The flange 61 is held between washer 62 having a recess to receive the flange 61 and flat washer 63. Flat headed screws 64 hold washers 62 and 63 together and the flat washer 63 in contact with the face of pedestal 60.

The door yoke 37 is formed with a U-shaped cross section and a guide 65 is formed with upper and lower surfaces for sliding engagement with the inner surfaces of the U-shaped yoke which keeps the door in alignment. See Fig. 14. It will be clear from the drawings that the door can be rotated with reference to the yoke 37 when the axle member 53 is screwed in to the point where the guide 65 is clear of the edges of the inside surfaces of the U-shaped yoke 37. This is necessary when it becomes desirable to reverse the door 31 so that it swings about bracket 33 instead of bracket 32. Brackets 32 and 33 with their hinge pins are made identical so that this reversal can be effected. As shown in the drawings, the yoke 37 hinges about bracket 32 and locks with bracket 33. By shifting the bearing sleeve 36 of the yoke 37 to bracket 33 and the latch member 43 with its spring 42 to bracket 32 and by swinging the door 180° about the axle member 53 the door 31 is completely reversed. It will be observed in Fig. 12 that a gasket 66 seated in an annular recess in the door is provided to contact the flange 67 around the door opening in the face 24 of the tub housing 12.

Mounted on the door yoke 37 is an upwardly extending arm 71 having an adjustable contact screw 72 mounted in the end thereof. A lock nut 73 is provided to hold the contact screw in place when adjusted. The contact screw 72 operates the double pole electric switch 74 for purposes to be explained later.

The perforated drum

The perforated drum (comprehensively designated 13) is mounted within the tub housing 12 on a drum shaft 75 which is supported in bearings 76 and 77 mounted in the tub housing 12. These bearings 76 and 77 are so constructed that the solvent in the tub housing 12 cannot mix with the lubricant in the bearings 76 and 77 or vice versa. The specific structure of these bearings will be taken up later, however. The drum 13 consists of a perforated cylindrical element 80 composed of two semi-circular sheets mounted on front and rear face members 81 and 82 respectively (see Fig. 4). The face members 81 and 82 are mounted on a cylindrical axle member 84 which has integrally formed therewith a perforated partition 85 extending diametrically across the drum, dividing it into two semi-cylindrical compartments. The cylindrical axle member 84 is keyed to the drum shaft 75 by keys 86 which are held in place by set screws 87 (see Fig. 15).

The front face 81 of the drum 13 has two identical doors 90, one for each of the compartments of the drum 13 (see Fig. 10). These doors are hingedly attached to the drum face by hinges 91. Slidably mounted in bosses 92 and 93 on each door are latch plungers 94 which engage circular openings in the curved latch bars 95 mounted on the drum face 81. There are two latch plungers 94 for each door 90 and they are joined together by a handle 96. Helical springs 97 around the latch plungers urge the latch plungers 94 into locking engagement with the latch bars 95. To facilitate the operation of these handles 96, a projecting flange-like element 100 is formed between the bosses 92 to provide a gripping ledge for the fingers or thumb.

In Fig. 11, there is shown a set screw 101 mounted on the door edge for contacting the flanges 102 of the door openings in the drum face 81. Set screw 101 is locked in place by locking screw 103. These set screws 101, two for each door 90, are adjusted to prevent rattling of the doors 90 which is particularly important when the drum 13 is revolving at a high speed. Knobs 99 are provided on the drum face 81 for manually rotating the drum 13.

The front and rear bearings of the drum

The two bearings 76 and 77 in which the drum shaft 75 revolves are the same except that the drum shaft 75 extends through the cap 105 of the rear bearing 77 in order that a driven sheave 107 may be mounted thereon. See Fig. 15. The driven sheave 107 is keyed to the end portion of the drum shaft 75 by key 110 and is urged against spacing sleeve 111 by locking ring 112 and cap screw 113 and lock washer 114 and this pressure is transmitted through spacing sleeve 111 to tapered sleeve 115. It will be noted that pressure is transmitted in the same way to tapered sleeve 115 of the front bearing 76 by lock ring 116 from cap screw 117. A felt seal ring 120 is provided in a recess formed in the cap 105 to make a fluid tight joint around the spacing sleeve 111.

Each bearing 76 and 77 consists of a number of identical elements (except as noted above) assembled within sleeves 121, which are seated in cylindrical openings in the tub housing 12. The bearing sleeve 121 with its associated cap (cap 106 for the front bearing and cap 105 for the rear bearing) is held in place by screws 122. Pressed into the innermost recess of the bearing sleeve 121 is seat ring 123 having a synthetic rubber mounting 124. The inner face of carbonaceous ring 126 is under axial pressure when in place and is forced against the outer face of the seat ring 123 by the seal spring 127 which exerts pressure on ring holder 130.

The ring holder 130 is attached to the inner edge of a synthetic rubber bellows 131 which at its outer end is held in tight contact around the drum shaft by holding ring 132 attached to the bellows. In assembling, the holding ring 132 and the outer end of the rubber bellows 131 are forced over the drum shaft 75 to form a fluid tight joint. The holding ring 132 has prongs 133 formed thereon which engage with slots in the ring holder 130. The periphery of the carbonaceous ring 126 is notched to receive lug formations projecting from inside the ring holder 130. Thus the bellows 131, the holding ring 132, the ring holder 130, the spring 127 and the carbonaceous ring 126 all rotate integrally with the drum shaft 75. The rubber mounted seat ring 123 does not rotate with the drum shaft 75. The outer end of the spring 127 abuts against the bearing spacer 135 which in turn is clamped between the ball bearing ring 136 and shoulder 140 formed on the drum shaft 75. It will be noticed in the drawings that the ball bearing ring 136 in the rear bearing 77 is clamped in place between the cap 105 and the sleeve 121 while there is room for adjustment of the ball bearing ring 136 in the front bearing 76 longitudinally of the drum shaft. The ball bearing ring 136 is wedged in place by tapered sleeve 115 which is threaded at its outer end to receive puller nuts (not shown) for removing the tapered sleeves 115. It will be noted that these tapered sleeves 115 rotate with the drum shaft 75.

A modified form of front and rear bearings for the drum

A modified form of front and rear bearings 150 and 151 having a metallic bellows are shown in Fig. 16. Within bearing sleeves 152 is a ball bearing ring 153 mounted on tapered sleeves 156. The removable sleeves 156 are threaded for and are readily removed by puller nuts (not shown). Drum shaft 75 is carried within removable tapered sleeves 156. Between the inner vertical wall of the bearing sleeves 152 and flange 159 of shaft seal comprehensively designated 154 is a gasket 155. The shaft seal 154 is of the metallic bellows type which is readily movable longitudinally within the flexing limits of the metal bellows 158 by a spring 157 which is a part of the seal assembly. Outer end element 160 of the shaft seal 154 bears against seat ring 161 which is mounted on drum shaft 154. Placed between the shoulder 163 of shaft 75 and seat ring 161 is gasket 165.

Since the front and rear bearings 150 and 151 are not identical, a detailed description of front bearing 150 will be given and then the differences in rear bearing 151 will be pointed out. The ball bearing ring 153 is not clamped longitudinally within the bearing sleeve 152 of the front bearing 150 but is capable of a limited longitudinal movement for adjustment. This allows for expansion of the drum shaft seal 154 and consequent longitudinal movement of the ball bearing ring 153 within the bearing sleeve of the front bearing 150. The shaft seal 154 is held stationary within bearing sleeve 152 by pressure sleeve 168. Pressure sleeve 168 is subject to pressure from set screws 166 threadedly mounted in clamping ring 167. The force applied by set screws 166 is opposed through clamping ring 167 by snap ring 170 which is mounted in a groove or recess in bearing sleeve 152. Gasket 165, the seat ring 161, the inner race of ball bearing 153 and the removable sleeve 156 are clamped together between the shoulder 163 of shaft 75 and lock ring 172, clamping pressure being exerted by cap screw 173 through lock washer 174. The bearing and seal closure is completed by the bearing cap 175. The bearing cap 175, gasket 176, bearing sleeve 152 and gasket 177 are fastened to front face 24 by screws 180 and lock washer 181.

As mentioned above, the rear bearing 151 differs only in a few particulars from the front bearing 150 first described. In the rear bearing 151 the bearing sleeve 152, the pressure sleeve 182 holds the stationary bellows assembly 154 against the gasket 165. Between the pressure sleeve 182 and the ball bearing 153 is a spacing ring 183. The outer race of ball bearing 153 is held from longitudinal movement by a flange on the bearing cap 186 which is held in place by the cap screws 180 and lock washers 181. The bearing cap 186 has an opening formed therein for the drum shaft 75 as in the preferred form shown in Fig. 15 and spacing sleeve 190 and felt seal ring 191 are analogous in every respect to spacing sleeve 111 and felt seal ring 120 in Fig. 15. The inside of the felt seal ring 191 bears against the outer surface of the spacing sleeve 190, the inner peripheral edge of which holds the removable tapered sleeve 156 in place. The outer end of the spacing sleeve 190 bears against the hub of driven sheave 107. The operation of these shaft sealing bearings will be obvious from the above detailed description and it will also be clear that these bearings contribute materially to the conditioning of the cleaning solvent by protecting the solvent from contamination from the bearing lubricant.

The ventilating duct and associated equipment

As is clearly shown in Fig. 4 an opening 200 is formed in the rear top portion of the tub housing 12 for connection to ventilating duct 201 which leads to aerating fan 202 mounted on bracket 203 mounted on the top of solvent tank 204. The fan 202 is driven by electric motor 210 and discharges to the atmosphere through pipe 205. The ventilating duct 201 is under the control of damper 206 which is shown in detail in Figs. 17 and 18. The electric switch 74 operated by the arm 71 previously referred to controls the electrical operation of the fan motor 210 and the damper 206 as will be fully understood by those skilled in the art.

The damper 206 includes a circular damper plate 209 mounted on a damper shaft 211 by bracket 212. The damper shaft 211 is rotatably mounted in holes formed in the duct 201 and extends across the duct 201 as shown in Fig. 17. The end of the damper shaft 211 away from the control end thereof extends through a washer 213 soldered in place around the hole formed in the duct 201. A felt seal washer 214 is held against the top of washer 213 by washer 215 which is held in place by screw 216 and washer 217. The opposite end of the damper shaft 211 also passes through a hole formed in the duct 201 and a washer 220 soldered around the hole. An operating lever 221 is integrally mounted on the end of the shaft 211 and a coil spring 222 is mounted around the shaft and compressed between the washer 220 and the operating lever 221 which compresses the felt seal washer 214 between washers 213 and 215 thereby avoiding leakage from the duct.

Mounted on the side of the duct 201 and over the area around the operating end of the damper shaft 211 is a housing 224, the duct 201 being strengthened in that area by plates 225. The operating lever 221 is controlled by a solenoid 232 mounted in the housing 224 by bracket 230, the wires 226 being connected to a source of power and an electrical control means referred to above. Plunger 231 of the solenoid 232 connects pivotally to one end of operating lever 221. Coil spring 234 anchored on the solenoid 232 connects to the other end of the operating lever 221 as is shown in Fig. 18. The coil spring 234 urges the damper plate 209 to its closed position and the energization of the solenoid 232 opens the damper plate 209. When the door 31 is open, the arm 71 causes the switch 74 to complete the electrical circuit energizing the fan motor 210 and the solenoid 232 which opens the damper 206. In this way the aeration duct 201 carries off the fumes from the tub housing 12 when the door 31 is open which prevents these fumes from coming out of the open door 31 to the discomfort of the operator.

The adjustable power means for driving the drum

The drum 13 is revolved by means of a source of power mounted in the machine base 10 within the left side compartment of the tub housing 12 as appears in Fig. 6. Rear end bracket 240 mounted on the machine base 10 and on the tub housing 12, provides additional strength in this area. A base plate 241 is slidably mounted for guided movement in the machine base 10 under control of the threaded shaft 242. This threaded control shaft 242 is rotatably mounted on its inner end in a flange-like downwardly extending projection 243 of the machine base 10 and threadedly engages depending lug 244 formed on the base plate 241. The outer end of the control shaft 242 extends through the machine base 10 and is appropriately formed to receive an operating handle or wrench. It will be seen from the drawings and the above description that by adjusting the shaft 242, the base plate can be moved longitudinally and in this way the belts 245 can be adjusted.

Mounted on the base plate 241 is a bracket 246 having vertical wall members 250 and 251. Mounted on top of the bracket 246 is a high speed drive motor 252 whose drive shaft connects by flexible coupling 254 to gear reducer 255 which is mounted on vertical wall member 251 of bracket 246. Mounted on the slow speed shaft of the gear reducer 255 is a drive sprocket 256 over which runs the conventionally indicated drive chain 257. The drive chain 257 is connected to over-running clutch 260 which is mounted on the inner end of the shaft 261 of electric motor 262 which is also mounted on the base plate 241. The overriding clutch mechanism is well known to the art and need not therefore be described further here. The outer end of the drive shaft 261 of the motor 262 has mounted thereon a drive sheave 265 which carries three V-belts 245 which are also carried by the driven sheave 107 mounted on the drum shaft 75. A belt guard 267 is mounted on the tub housing 12 and extends around the drive sheave 265, the driven sheave 107 and the belts 245.

When driving the drum 13 at slow or washing speed, the shaft 261 of the motor 262 becomes a countershaft since the motor 262 is not electrically energized. The shaft 261 of the motor 262 thus is driven by the sprocket affixed to over-running clutch 260 by the drive chain 257, which is driven by the drive sprocket 256 mounted on the slow speed shaft of the gear reducer 255. The high speed shaft of the gear reducer 255 is driven through flexible coupling 254 by the drive motor 252. Through this drive the drum 13 is driven by the motor 252 at a speed of approximately 30 R. P. M. When the motor 262 is energized, its shaft 261 tends to turn at greater speed and the inner portion of the over-running clutch 260 over-rides its outer portion to which the driven sprocket is affixed. Thus, the motor 262 over-runs the slow speed drive and takes over the drive of the sheave 265, the V-belts 245 running over driven sheave 107 affixed to the drum shaft 75, causing the drum 13 to be rotated at a higher speed. As will be explained later, this higher speed is effected by a gradual increase in order to permit the materials being cleaned to adjust themselves to the changed center of gravity resulting from the draining off of the cleaning solvent. When this motor 262 reaches its maximum speed, the drum 13 is rotating at 550 R. P. M. due to the ratio of the drive sheave 265 and the driven sheave 107. The operating relays and controls for electric motors 252 and 262 will be later described in this description.

The braking means for the drum

The braking means operating on the inner end of the drum shaft 75 is of a conventional type controlled through a solenoid 275. Mounted on the inner end of drum shaft 75 is a brake drum 270 on which conventional brake shoes 271 operate by frictional engagement. The brake shoes 271 are pivotally mounted on bracket 272 mounted on the back of the tub housing 12. The other ends of the brake shoes 271 are pivotally connected to spring actuated control levers which are operated through a linkage in a conventional manner by solenoid 275 as will be well understood in the art. When solenoid 275 is energized the brake shoes 271 are loosened in their normal spring urged grip on the brake drum 270. The deenergization of the solenoid 275 causes a braking action by the normal spring urged gripping of brake shoes 271 on brake drum 270. The brake means may be operated manually by push button 545 mounted on control bracket 541.

The flow of cleaning solvent and the linkage control

The cleaning solvent enters the tub housing 12 through pipe 280 which connects to two filters 281. The solvent leaves the tub housing 12 through overflow pipe 282 which leads into bottom drain pipe 283 also connecting into the tub housing 12 at the bottom thereof. The drain pipe 283 leads from the tub housing 12 to lint trap 284 mounted on solvent tank 204. Vent pipe 285 leads from a point in the tub housing 12 well above the overflow level and into overflow pipe 282.

Valve 286 controls the flow of solvent through pipe 280 into the tub housing 12. A by-pass pipe 288 leading to the solvent tank 204 connects with pipe 280 and is controlled by valve 287 which is placed close to the valve 286 in order that the operating levers 290 of these valves may be controlled by a common control link 291. Fig. 9 shows the detail of the pivotal connection between operating levers 290 of valves 286 and 287 and the common control link 291. The linkage control is such that when valve 286 is open, valve 287 is closed and vice versa.

This common control link 291 also connects with the operating lever 293 of drain valve 294 controlling drain pipe 283 so that the control of these three valves 286, 287 and 294 is unified. The purpose of this control is to by-pass solvent back into the solvent tank 204 without circulating through the tub housing 12 whenever and as long as the drain valve 294 is open. When the drain valve 294 is closed the valve 286 is open to permit solvent to flow into the tub housing 12 and the valve 287 is closed which prevents solvent returning to solvent tank 204 through the by-pass pipe 288. It will be noted from the drawings that both the bottom drain pipe 283 and the by-pass pipe 280 include flexible sections 297 and 298 respectively.

Figs. 6, 7 and 8 show the details of the linkage control of drain valve 294 through common control link 291. Referring to these figures of the drawings, it will be seen that the end of the common control link 291 pivotally connects with the operating lever 293 of drain valve 294 in a conventional manner and that the operating lever 293 is operated by crank arm 300 of electric motor 301 through link 302 as will be well understood in the art. The pivotal connection between link 302 and operating lever 293 is shown in detail in Fig. 8 and will be fully understood by those skilled in the art without further comment.

The sump pump

A sump pump 305 is mounted on the solvent tank 204 and mounted on the upper flange of the sump pump 305 is an electric pump motor 306.

The sump pump 305 discharges solvent under pressure through pipe line 310, the pressure being registered by pressure gauge 311. The pipe line 310 connects into pipe line 312 which has pipe connections 313 leading to filter manifolds 314 under the control of valves 315. Pipe line 312 also leads to the condenser 3 under the control of valve 316.

The filtering equipment

The twin filters 281 are mounted on the solvent tank 204 and may be operated independently or together in parallel by means of the control valves provided therefor. Each filter 281 includes a boxlike metal body 320 having a removable cover member 321 carried by a cover yoke 322 which is hingedly attached to the body 320.

A filter manifold 314 is mounted at the top of one side of the body 320 and connects to pipe 313. Filter bag nipples 324 having radial holes 327 are mounted in the body 320 and lead from the manifold 314 into filter bags 325 mounted on the nipples 324. Leather reinforcement pieces 326 are provided on the filter bags 325 where the nipples 324 enter the filter bags 325. The filter bags 325 are made of a twill material and it has been found that approximately 190 drill is a very good material for this purpose. Surrounding the bag area within the filter body 320 are side filter screens 330 and bottom filter screen 331. Screens 332 are positioned between the filter bags 325. The filter bags 325 have openings at the top which are closed by slide fasteners 334. It will be noticed in Fig. 19 that side filter screen 330 is reduced in height to accommodate the nipples 324.

The filter bags and associated spacing means

The filter bags 325 and screens 330 and 332 are supported in place in the filter body by means of a spacing gate comprehensively designated as 340. Two modifications of the spacing gate are shown in Figs. 25-29. The spacing gate is removable or retractable to afford room for the ready removal of the filter bags 325. The preferred form of spacing gate 340 includes a frame 341 having upper and lower frame members 342 and 343 respectively and spacing blades 344 rotatably mounted between said upper and lower frame members 342 and 343. In this form of spacing gate and also in the two modified forms hereinafter described, longitudinal strengthening members 337 are provided on the screen adjacent to the spacing gate. The spacing blades 344 are integrally attached to axle members 346 which extend beyond the spacing plates 344 to form journals which are received by bushings 347 and 348 mounted in the upper and lower frame members 342 and 343. It will be noted that lower bushing 347 is formed with a shoulder 349. Upper and lower shift bars 351, 352 respectively are pivotally connected to the spacing blades 344 by means of pins 353 mounted on the spacing blades 344. An operating handle 356 is mounted on the upper end of one of the central spacing blades 344 as shown in Figs. 20 and 22. It will be seen from Fig. 22 that when the handle 356 is moved from right to left the spacing blades 344 will be rotated about the axle members 346 by means of the shift bars 351 and 352 resulting in a collapsing or retracting of the spacing gate to allow for more bag space within the filter body 340.

A modified form of spacing means

Figs. 25 and 26 show a modified form of spacing means which consists of hollow wedge shaped spacers 360 and 361. The tapered faces 362 and 363 of the hollow wedge shaped spacers 360 and 361 bear against each other so that flat vertical surfaces 364 and 365 are provided for contacting the strengthening members 337 of the screen 330 and the adjacent wall of the filter housing 320. In the larger end of each hollow wedge shaped spacer a removal slot 366 is formed to function as a handle for removing the spacer. The operation of this form of spacing means involves the removal of one hollow wedge shaped spacer adjacent to the wall of the filter housing which provides space for the removal of the filter bags 325.

A second modification of the spacing means

A second modification of spacing gate is shown in Figs. 27, 28 and 29. In this form, spacing blades 370 are pivotally supported on side frame members 371 and 372 by means of pivots 373 mounted on the ends of the spacing blades 370 and journalled in bearings formed in brackets 375 mounted on the side frame members 371 and 372. The frame members 371 and 372 are rigidly attached to a plurality of longitudinal frame members 376 formed with an angular cross section to provide a contact edge at the vertex of the angle. This contact edge is designed to contact the strengthening member 337 on the screen as shown in the drawings. Intermediate vertical frame members 380 are provided which give the frame the general appearance of a grating.

An operating bar 381 is vertically mounted centrally on the frame with capacity for limited sliding movement in the direction of its length. The operating bar 381 is supported for this movement by rods 382 mounted on four of the intermediate grate members 380 of the frame, the rods 382 engaging the slots 383 in the operating bar 381 and being held in engagement therewith by washers 384 welded to the rods 382. Notches are formed in the operating bar to provide shoulders 386 and 387 for contacting the upper and lower faces respectively of the spacing blades 370 to urge the blades 370 up or down on their pivot members 373. The operating bar 381 is supported in its up position, which is the extended condition of the gate, by supporting lever 390 pivotally mounted on the filter body 320. The supporting lever engages the under side of member 391 mounted at the top of the operating bar 381.

The operation of this modified form of gate is simple and positive. To collapse the gate from its extended condition in Fig. 28 the supporting lever 390 is swung clear of member 391 which permits the operating bar 381 to be urged downward so that the upper shoulders 386 of the notches contact the top faces of the blades 370. The blades 370 are thus urged to swing downward about their pivots 373 into the position shown in Fig. 29. To expand the gate from the collapsed condition of Fig. 29 to the extended condition of Fig. 28 the above operation is merely reversed.

The cover member 321 of the filter has a gasket 394 seated in a peripheral channel formed in the cover member 321. The gasket 394 contacts the top edge of the filter body 320 when the cover member 321 is in its closed position. The cover member 321 has an inner face plate 395 fastening by flat headed screws 396 to the cover 321 on its under side. The cover member 321 is mounted on the yoke 322 by means of a threaded axle 397 which is in threaded engagement with the yoke 322. This threaded axle 397 has a journal 398 which is received by a bearing formed in a center boss 400 of the cover member 321. This journal 398 is held in place in its bearing with capacity for rotary movement by means of a pin 401 which coacts with a circumferential groove 402 formed around the axle member 397. The upper end of the axle member 397 carries a hand wheel 403 which is held in place by a cap screw and lock washer (not shown). The yoke 322 is hingedly mounted on the filter body 320 by means of a hinge pin 404 held in a bracket 405 which is formed on the filter body 320. The free end of the yoke 322 is formed with a bifurcated end 405 to engage a latch member 406 by receiving a pin 407 mounted in latch member 406. The latch member 406 is pivotally mounted between lugs 410 formed on the top of the manifold of the filter by means of removable pin 414. A vent pipe 411 communicating with the interior of the filter is mounted on the filter cover 321 with a conventional pet-cock 412 in the outlet end thereof. The vent pipe also has a check valve 413 of a conventional type.

A bottom discharge orifice 415 is provided at the bottom of the filter body 320 in communication with the channel-like space 416 formed in the bottom of the filter body 320. These orifices 415 of the two filters are connected by pipe line 417. The pipe line 280 leading into the tub housing 12 connects to this pipe line 417. At the central portion of this pipe line 417, a pipe connection 418 is provided leading into the solvent tank 204 under the control of valve 421. Valves 422 are provided in the pipe line 417 for each filter between the filter and the pipe connection 418. By the proper manipulation of the valves 421, 286 and 287 the filters can be connected to discharge into the solvent tank through pipe connection 418 or into the tub housing through pipe line 280. Further the filters may be connected to operate together in parallel or with one filter cut out.

*The lint trap*

Also mounted on the solvent tank is a lint trap 284 within which is suspended a lint basket 427 which extends down into the solvent tank 204. The lint basket 427 serves to strain the solvent which is drained from the tub housing 12 through drain pipe 283. The lint basket 427 is intended to remove such material as buttons, coins, or other articles from the clothing being washed in the tub housing 12. A handle member 428 is provided for removing or positioning the lint basket 427. In the operation of this invention a filter powder of any type well known to the art is placed in the lint trap 284 for circulation with the solvent for conditioning the filters 281. The lint trap 284 has a cover member 430 for access thereto.

*The distillation unit*

The still body 437 shown in Figs. 30 to 34 is mounted on still base 429 and has a tight welded bottom 434, and upper and lower domes 435 and 436 mounted inside the upper part of the still body 437 and an upper flange 433 to which is bolted a flanged cover member 440. Directly above the bottom 434 of the still body 437 is a flanged lower opening 442 to receive steam coils 443. The two ends of the steam coil 443 extending into the still body 437 are mounted in lower cover member or header 444 which is bolted over the flanged lower opening 442 with gasket 445 therebetween. Steam inlet and steam outlet chambers 446 and 447 respectively are formed in the header 444 and an end of the steam coil 443 communicates with each of said chambers 446 and 447. Mounted in the sidewall of the still body 437 is a gauge glass 450 of conventional form with protecting rods. Extending centrally through the upper and lower domes 435 and 436 is welded a vapor connecting pipe 451. Above the vapor connecting pipe 451 is a vapor deflecting cone or conical baffle 452, the supports 453 of which rest on the upper dome 435. Depending from the bottom and apex of the deflecting cone 452 is a small J tube 455 through which liquid condensate from within the cone may return to the bottom of the still. The shape of this J tube is such that the bottom of the J fills with condensate and vapors arising from the bottom of the still are prevented from entering the bottom of the deflecting cone 452, see Fig. 35.

Extending around the deflecting cone 452 in the upper part of the still body 437 is a condenser unit 460. The condenser unit 460 is provided with a divided header 461, the divisions 462 and 463 of which being provided with connecting nipples 466 and 467. The connecting nipples 466 and 467 are provided with lead washers and nuts as shown. Cooling water entering the lower connecting nipple 467 is conducted into one side 462 of the divided header 461 of the condenser unit 460. The water or cooling medium then passes from the divided header 461 through a plurality of circular tubes 470 and back into the other side of the divided header 463 and out through the upper connecting nipple 466. The flanged cover 440 is provided with an opening normally closed by removable plug 474. Through the sidewall of the still body 437 just above the upper dome 435 is a solvent outlet connection 475.

A contaminated solvent inlet connection 476 connects the still body 437 with a level control 477 mounted on the still base 429. Pipe line 312 from the solvent tank 204 leads into the level control at inlet 480. Overflow pipe 481 leads from the level control 477 at a point some distance above the connection 476. This overflow pipe 481 connects into pipe line 482 leading from after cooler 483 back into the solvent tank 204 through pipe line 491. The after cooler 483 is provided to cool condensed solvent leaving the still body 437 through the solvent outlet connection 475 which connects to the after cooler 483. The cooled solvent, after passing through the after cooler 483 enters pipe line 482 through pipe connection 489 (Fig 34) under the control of valve 490. Pipe line 484 to an outside reservoir is also connected to pipe 489 under control of valve 485. Thus the cleaned and cooled solvent may be returned either to the storage tank 204 or led to an outside reservoir by manipulating the valves 490 and 485. The pipe line 482 is extended upward in reduced size by pipe line 492 which leads into both the top of the level control 477 by connection 494 and into the top part of the still body 437 for the purpose of venting both the upper part of the still body 437 and the level control 477. It will be noted from Fig. 31 and Fig. 32 that the vent pipe line 492 extends upward inside the still to near the cover member 440 of the still body 437.

Cooling water or other cooling medium for the condenser tubes 470 and the after cooler 483 enters the pipe T 496 below the after cooler 483. The pipe T 496 is provided with a blanked off end at the bottom which carries a pipe support 497 and flange connection 498 which is fastened to the still base 429. The upper connection of pipe T 496 connects to the bottom of after cooler 483 as shown in Fig. 30 and leads into a heat interchange pipe coil (not shown) of a conventional form mounted within the after cooler 483. The upper end of heat interchange pipe coil connects to pipe connection 500 at the top of the after cooler 483. The pipe connection 500 is connected to pipe line 501 which connects to the intake side of the divider header 461. The outlet side of divided header 461 is connected to pipe 502 (see Fig. 31). The circulation of the cooling water from pipe line 504 may be traced through pipe T 496, the heat-interchange pipe coil within the after cooler 483, the connection 500, the pipe line 501 into the condenser unit 460 and out of the condenser unit by pipe 502.

*The electrical control system, and the operation thereof with a tracing of circuits*

The control of the electrical devices referred to above is effected by means of control equipment mounted on a power panel 540 housed within the right hand side compartment 16 of tub housing 12. This power panel 540 is operatively associated with the manual control bracket 541 mounted on the top of the tub housing 12 (see Fig. 36). Mounted on the control bracket 541 are pump selector switch 542, aeration selector switch 543, extraction selector switch 544, brake switch 545, pilot light 546, safety limit and door switch 74 and timer 550 having a timer dial 590. A signal bell 548 is mounted immediately behind the control bracket 541 on a supporting bracket 549 mounted on the tub housing 12. A rear cover member 452 (see Fig. 4) is mounted on the rear of the control bracket 541, enclosing therein the timer 550, the signal bell 548 and other devices mounted on the control bracket 541.

Included in the control equipment mounted on the power panel 540 are a second timer 551 and a transformer 641 for controlling the speed of high speed extracting motor 262. The wiring of the control equipment involving devices well known to the art is conventional in form and is schematically shown in Fig. 38. The timers 550 and 551 are now conventional in the art and need not be further described here.

The sources of electrical power are indicated at 562 and 563 and the main power lines are designated 564 and 565. The two timers 550 and 551 about which the automatic feature of the invention is built are designated by dotted lines.

The various motors, switches and the like referred to above by number are given similar numbers in Fig. 38. When the manually operated pump switch 542 is closed, relay 566 is energized which closes switch 567 causing pump motor 306 to start. This pump motor 306 operates the sump pump 305 which sets up the circulation of the solvent either through the drum housing 12 or through by-pass pipe 288 and back to the solvent tank 204. This circuit may be traced as follows: wire 570 including the relay 566 connects to the two power lines 564 and 565. Wire 578 including the switch 567 connects to wire 570 and the pump motor 306; and wire 572 connects the pump motor 306 to the power main 565.

The door switch 74 is double poled and when the outer door 31 is open the switch 74 closes contacts 573 and 574 in wire 575 which includes the hand operated aeration switch 543. The wire 575 including a relay 576 connects to the two power lines 564 and 565. The relay 576 which operates switch 580 included in wire 581 connects the fan motor 210 to the wire 575. Wire 582 connects the fan motor 210 with the power line 565. Wire 583 energizing the damper solenoid 232 operating the damper plate 209, connects to the wire 581 and the power line 565 thereby connecting the fan motor 210 and the damper solenoid 232 in parallel and both under the control of the door switch 74 and the manually operated aeration switch 543. Thus when the outer door 31 is open and the machine is in its normally inoperative condition, the fan motor 210 does not operate automatically under the control of door switch 74 until and unless the manually controlled aeration switch 543 is turned to the automatic position as shown in Fig. 36.

In operation, the aeration switch 543 is turned to the automatic position and the outer loading door 31 is closed which causes the arm 71 to mechanically operate the double poled door switch 74, opening the contacts 573, and 574 and closing the contacts 585 and 586. This stops the running of the aeration fan motor 210 and closes the damper plate 209.

A manual movement of the timer dial 590 in a clockwise direction from its "stop" position into the beginning of the "washing" positions as indicated on the dial by the word "Wash," causes switch 591 to move from contact 592 to contact 593 thereby setting up a circuit energizing the pilot light 546 and breaking the circuit through the bell 548. This circuit may be traced as follows: wire 589 including contacts 585 and 586 and timer switch 591 and its contact 593 connects to one power line 564 and also to wire 594 which includes the pilot light 546 and connects to the other power line 565. When the switch 591 closes contact 592, the bell 548 is energized through wire 595 connecting to the contact 592 and to the power line 565.

The contact 593 is also connected with wire 596 which leads to timer switch 600. The timer switch 600 controls the operation of the valve operating motor 301 through its two switch contacts 601 and 602 by which the valve motor 301 may be reversed. Contact 601 controls the circuit formed by wires 603 and 604 connected to the valve operating motor 301. Wire 603 includes limit switch 605 which is of a conventional cam operated type and limits the operation of the motor in one direction to the movement of the operating arm 300 through 180° (see Fig. 6). The movement of the operating arm 300 is limited in the other direction by a similar cam operated limit switch 606. When limit switch 605 is closed as shown in Fig. 38, the circuit by which the valve operating motor 301 is operated is prepared for completion on the movement of timer switch 592 to its contact 593. The operation of the valve motor 301 under these conditions moves the operating arm 300 through 180° when it is stopped by the functioning of the limit switch 606 which closes the drain valve 294 and the by-pass valve 287 and opens the inlet valve 286 by means of the linkage described above (see Figs. 6, 7 and 9). When the valve operating motor 301 with its limit switches 605 and 606 is in the condition shown in Fig. 38, the drain valve 294 and by-pass valve 287 are open and the inlet valve 286 is shut.

Thus the movement of switch 592 to contact 593, in addition to energizing the pilot light 546, controls the drain valve 294, the by-pass valve 287 and the inlet valve 286 so that cleaning solvent may be pumped from the storage tank by sump pump 305 through the discharge pipe line 310 through the filters 281 and into the tub housing 12 through inlet valve 286 in pipe line 280. Since the drain valve 294 is closed, the cleaning solvent fills the tub housing 12 up to the level of the top opening of the overflow pipe 282. The cleaning solvent then flows out of the tub housing 12, through the overflow pipe 282, into the drain pipe 283, through the lint trap 284 and back into the storage tank 204. The solvent is thus circulating through the tub housing 12 but the drum 13 is motionless at this stage.

A still further movement of the dial 590 of the timer 550 in a clockwise direction will close timer switch 610 by moving it to contact 611, thereby energizing relay 612 through wire 613 connecting to power line 565. The operation of relay 612 closes relay switch 614 which energizes the washer motor 252, through wires 615 and 616. The dial 590 of the timer 550 is so arranged that a selective time for the washing period may be designated for use. The time can be varied up to thirty minutes according to the cleaning requirement of the article being washed, the numbers on the timer dial 590 indicating minutes. The further movement of the timer dial 590 in the selection of a washing period closes switch 617 by moving it to contact 620, which energizes the timer motor 618 through wires 619 and 621. The washing motor 252 continues to operate during the pre-selected period under the control of the timer 550, at the end of which period the switch 600 is moved to contact 602, opening contact 601. This energizes relay 623, through wires 624 and 630 and also energizes the valve operating motor 301 through wire 625 including the limit switch 606, thereby reversing operating motor 301 to move through its 180° period of movement, which opens the drain valve 294, the by-pass valve 287 and closes the inlet valve 286, thereby diverting the circulating cleaning solvent from the tub housing 12, through the by-pass pipe line 288 to the storage tank 204, and also draining the tub housing 12 through drain pipe 283.

The energization of relay 623 closes switch 626 included in wire 624 which leads through switch 631 to timer motor 629. Thus one side of the timer motor 629 is connected to the power line 564 by wiring which traces as follows: wire 624 including switches 631 and 626 leads to contact 602 of closed switch 600, wire 596 to contact 593, switch 591, and wire 589 including closed switch 74. Wire 627 connects the other side of the timer motor 629 to the power line 565 through wires 630 and 621 leading from the relay 623 to the power line 565. Included in the wire 630 is the manually operable extractor switch 544 which is closed for the automatic operation of the machine. The function of the switch 631 is to stop the timer motor 629 at the end of the cycle as will be pointed out later.

The operation of the timer motor 629 controls the drainage period of substantially 2 minutes which precedes the initiation of the extraction period during which the cleaning solvent is extracted from the materials being cleaned. After 2 minutes have elapsed from the starting of the timer motor 629, switch 632 is closed by the timer cams which energizes relay 633. The relay 633 is included in wire 634 connecting to wires 635 and 636 which lead into the two power lines. The energization of the relay 633 closes switch 637 in wire 640 connecting to the extractor motor 262 and to transformer 641 at the 200 volt point through switch 648. Switch 648 is manually adjustable to connect wire 640 to wires 649 or 659 which connect to voltage step-up taps on the transformer 641. These voltage step-up taps provide an increase over the line voltage of 220 to 230 and 240 volts respectively. In practice it has been found necessary to use these higher voltage taps due to low line voltage at point of use. Wire 642 connects to the wire 635 thereby setting up a circuit energizing the extractor motor 262 at a transformed voltage of 200. The transformer 641 is connected across the power lines 564 and 565 by connection at one end to the wire 636 and connection at the other end to wire 643 which connects to the power line 564. The energization of the extractor motor 262 at the transformed voltage of 200 is timed for a period of 4 seconds at the end of which the switch 632 is opened and switch 644 is closed setting up a circuit through wire 645 which energizes relay 646, thereby closing switch 647. The closure of switch 647 sets up a circuit energizing extractor motor 262 at the transformed voltage of 120 through wire 650 connecting the transformer 641 with wire 640 leading to the extractor motor 262.

The extractor motor 262 operates at this transformed voltage of 120 for a period of substantially 13 seconds at the end of which period the switch 644 opens and switch 651 closes. This energizes relay 652 through wire 653 connecting to wires 635 and 636. The energization of the relay 652 closes switch 654 in wire 658 which connects to the wire 640 and the transformer at the 150 volt point. This results in the energization of the extractor motor at the transformed voltage of 150 and thereby gradually increases its speed.

At the end of a period of about 63 seconds, the switch 651 is opened and switch 657 is closed. This energizes relay 660 through wire 661 connecting to wires 635 and 636. The energization of the relay 660 closes switch 662 in wire 663 which connects to the wire 640 and the wire 643 thereby energizing the extractor motor 262 at the line voltage of 220, under which the extractor motor is brought to top speed for a period of 2 minutes and 40 seconds. At the end of this period, which is the end of the cycle, the switch 657 opens, de-energizing the extractor motor 262. At the same time switch 665 opens, de-energizing the motor 618 of timer 550, and the switch 631 opens de-energizing the motor 629 of timer 551.

The timers 650 and 651 before being de-energized return their cam operated switches to the positions shown in Fig. 38 which causes the brake to operate by the de-energization of the brake solenoid 275, the pilot light 546 to be turned off, and the warning bell 548 to be turned on, indicating the end of the cycle. Under the influence of the brake, the drum 13 stops rotating. Thus the above described system of electrical control and operation provides automatic operation subject to flexibility of manual control as in the selection of washing periods of varying lengths. The extractor motor 252 is automatically controlled for a gradual increase of speed to allow the material being cleaned to adjust the center of gravity for a high speed. It will be obvious to those skilled in the art that additional steps may be included in the automatic cycle such as a soaping operation at the beginning of the cycle, which is merely indicated on the timer dial 590 as an obvious development for those who prefer to include such a step in the process.

A further description of the operation

While the operation of the invention has been suggested in connection with the description of its construction, a more detailed description of the operation at this point will show the structure more clearly as an operative unity. In order to prepare the machine for automatic operation, the aeration switch 543 is turned to "automatic" and the extraction switch 544 is turned to "on." Clothes to be cleaned in this apparatus are divided into half loads of approximately 12½ lbs. each. The first half load of clothes is manually placed in the machine through the opening of the outer door 31 in the front face 24 and also through the opening of one of the inner doors 90 of the drum 13. The inner door 90 is then closed and the second inner door 90 is brought into alignment manually with the opening of the outer door 31 and the second half load of clothes is manually placed in the drum 13. In manually rotating the drum 13, it is necessary to release the brake shoes 271 which is accomplished by pressing the push button 545. The second inner door 90 is now closed; the outer door 31 is closed, and the gasket 66 mounted on the outer door 31 is brought into pressure contact against the flange 67 of the door opening in the front face 24 by movement of the hand wheel 54.

The upward reaching arm 71 is now in contact with the door switch 74. When the outer door 31 was opened, the door switch 74 closed the circuit to the fan motor 210 and opened the damper plate 209 in the aeration duct 201, the damper plate 209 being operated by the solenoid 232. With the outer door 31 open, air is sucked by the fan 202 through aeration duct 201 and through the open outer door 31. When the outer door 31 is closed and the upward reaching arm 71 engages the door switch 74, the circuit to the fan motor 210 and the solenoid 232 is broken. Thus, the fan motor 210 stops and the damper plate 209 is closed. The door switch 74 being double poled, a new circuit is set up which prepares the electric circuits for the operation of the automatic cycle on the movement of the dial 590 of the timer 550. The timer dial 590 is now manually rotated in a clockwise direction and the valve operated motor 301 changes the position of the valves 286, 287 and 294. The solvent for cleaning now being pumped through the filters 281 by the pump 305 after leaving the filters 281 through pipe lines 417 and 280 now passes through inlet valve 286 adjacent to the tub housing 12 and thus fills the tub housing 12 to an overflowing liquid level. The solvent then overflows through overflow pipe line 282 through drain piping 283 from which it flows into the lint trap 284 through the lint basket 427 within the storage tank 204.

A further manual movement of the timer dial 590 of the timer 550 in a clockwise direction then starts the washer motor 252 which drives the rotating drum 13 through the gear reducer 255, drive sprocket 256, chain 257, overrunning clutch 260, and the shaft 261 of the motor 262, sheave wheel 265, belts 245 and the driven sheave wheel 107. The rotating drum 13 and the two half loads of clothes are thus rotated at washing speed (30 R. P. M.) and by this rotation of the drum 13 the clothes are doused or immersed in the overflowing solvent within the tub housing 12 thirty times per minute. In moving the timer dial 590 to this washing position, the time of washing period may be pre-selected since the dial 590 is graduated for a washing period of 0 to 30 minutes. Once the washing period is selected, the timer dial 590 is automatically rotated by the motor of the timer 618 until the dial 590 moving still in a clockwise direction reaches the graduated portions which indicates drain time. When this drain time is reached, the valve operator motor 301 is again energized but reversed and by its movement opens the drain valve 294 and reverses the positions of the valves 286 and 287. The solvent now being pumped through the pipe line 280 again enters the by-pass pipe line 288 and passes into the storage tank 204. The solvent within the tub housing 12 is now drained through the drain piping 283 into the lint trap 284 where it passes through the lint basket 427 into the storage tank 204. The time allowed for draining is approximately two minutes and the timer 550 continues to move in a clockwise direction to the end of the draining time when extraction begins. At the beginning of the extraction time the motor 262 is energized with the proper preselected voltage through a transformer by means of switch 648 to overcome the initial inertia, then the motor is energized at a substantially lower voltage followed by a timed series of stepped up voltages which drives the drum 13 at a gradually accelerating speed until it reaches its maximum extraction speed of 550 R. P. M. The period of acceleration is substantially 80 seconds although successful operation has shown that acceleration may be as rapid as 40 seconds. As pointed out above, this slow acceleration in speed of the drum 13 allows the unbalanced clothes to position themselves in balance as solvent is thrown by centrifugal force from the clothes and at the same time it allows the clothes to gradually seek a new center of gravity and thus remain in balance. This action is evidenced by the small amount of vibration as compared with the vibration in an apparatus operated with a high rate of acceleration.

The drum 13 continues to rotate at high speed to the end of the extraction cycle when the motor 262 is automatically de-energized and the brake shoes 271 stop the drum 13 from rotating. At this point, the pilot light 546 which was lit at the beginning of the cycle goes out and the bell 548 rings to warn the operator that the cycle is finished. The operator then turns the hand wheel 54 and re-opens the door 31, presses the brake switch 545 and moves the drum 13 so that one of the inner doors 90 comes into alignment with the outer door opening in the front face 24. The inner door 90 is then opened and the clothes removed. A second manual movement of the drum 13 is now required to bring the second inner door 90 into alignment with the outer door opening in the front face 24. The second inner door 90 is now opened and the second half load of clothes removed. When the outer door 31 is opened the door switch 74 again changes contacts so that the fan motor 210 is again energized and the damper plate 209 is again opened by the solenoid 232. Thus, fresh air is brought through the outer door opening in the front face 24 to prevent fumes from the solvent within the tub housing 12 from escaping through the open door 31 in the face 24.

While I have described a preferred form and certain modifications of my invention in considerable detail, it will be obvious to one skilled in the art that various changes and modifications can be made therein without departing from the spirit of the invention as hereinafter claimed.

I claim:

1. A dry cleaning machine comprising a cleaning chamber, a rotary drum mounted in said cleaning chamber, a drum motor for rotating said drum, an extractor motor for rotating said drum at high speed, said drum motor and said extractor motor being operatively coordinated by an over-riding clutch mechanism, a filter connected to said cleaning chamber by a solvent inlet pipe controlled by an inlet valve, a circulating pump connected to said filter by a solvent supply line, a solvent tank connected to the suction side of said circulating pump, a by-pass pipe connecting said solvent inlet pipe with said solvent tank and controlled by a by-pass valve, a drain pipe leading from the bottom portion of said cleaning chamber into said solvent tank and controlled by a drain valve, an overflow pipe leading from said cleaning chamber to said storage tank, a linkage control unifying the operation of said inlet valve, said by-pass valve and said drain valve, an electric valve control motor for operating said linkage control, an electrical control system comprising a plurality of relays for controlling the operation of said drum motor, said extractor motor, said circulating motor, and said valve control motor, a transformer for controlling the speed of said extractor motor whereby said speed may be gradually increased, and a timer means for controlling the operation of said relays and said transformer according to a predetermined cycle of operation.

2. The invention of claim 1 characterized further by an automatic visual signal operative while the invention is in operation and an automatic auditory signal operative at the completion of an operating cycle of the invention.

3. A dry cleaning machine comprising a cleaning chamber, a rotary perforated drum mounted in said cleaning chamber, a means for rotating said drum, a solvent tank, a filter, a circulating pump, said cleaning chamber, solvent tank, filter and circulating pump being connected in a solvent circulating system, a by-pass pipe having a by-pass valve and connected into said circulating system to by-pass said cleaning chamber, an inlet valve controlling the flow of solvent into said cleaning chamber, a drain valve controlling the draining of solvent out of said cleaning chamber, an overflow pipe leading from a level in said cleaning chamber above the level of said drain valve and into said storage tank, and a linkage control unifying the controlled operation of said inlet valve, said by-pass valve and said drain valve whereby said by-pass valve and said drain valve are both open or closed together and said inlet valve is open only when said other valves are closed.

4. The invention of claim 3 characterized further by the fact that said means for rotating said drum consists of an electric motor connected to a reducing gear, a high speed electric motor having an over-riding clutch device on one end of its shaft, said over-riding clutch being connected to the driving side of said reducing gear, and a drive means connecting the other end of said shaft of said high speed motor to said drum.

5. The invention of claim 3 characterized further by the fact that a still is connected to said solvent tank and control valves are provided to control the flow of solvent to and from said still.

6. The invention of claim 3 characterized further by the fact that said circulating system also includes a lint trap which is by-passed by said by-pass pipe along with said cleaning chamber.

7. A dry cleaning machine comprising a cleaning chamber, a rotary drum mounted in said cleaning chamber, a drum motor for rotating said drum, a filter connected to said cleaning chamber by a solvent inlet pipe controlled by an inlet valve, a circulating pump connected to said filter by a solvent supply line, a solvent tank connected to the suction side of said circulating pump, a by-pass pipe connecting said solvent inlet pipe with said solvent tank and controlled by a by-pass valve, a drain pipe leading from the bottom portion of said cleaning chamber into said solvent tank and controlled by a drain valve, an overflow pipe leading from said cleaning chamber to said storage tank, and a linkage control unifying the operation of said inlet valve, said by-pass valve and said drain valve.

8. The invention claimed in claim 7 characterized further by an electric valve control motor for operating said linkage control.

9. The invention of claim 8 characterized further by an electrical control system comprising a plurality of electrical relays for controlling the operation of said pump motor, said drum motor and said valve control motor, and a timer means for automatically controlling said relays according to a predetermined cycle of operation.

10. The invention of claim 9 characterized further by the fact that said predetermined cycle of operation includes a controlled washing stage according to a predetermined period of time, the subsequent drainage of solvent from the cleaning chamber; the extraction of the solvent from the material being cleaned by a gradual increase of the rotation speed of the drum.

11. The invention of claim 7 characterized further by the fact that said filter comprises a plurality of fabric bags separated and surrounded by a plurality of screening means, and means for introducing the flow of solvent into the inside of said bags.

12. The invention of claim 11 characterized further by the fact that a spacing gate is positioned within said filter in supporting relation to said bags.

CLARENCE F. DINLEY.

REFERENCES CITED

The following references are of record in the file of this patent:

UNITED STATES PATENTS

| Number | Name | Date |
|---|---|---|
| 1,279,139 | Nieman | Sept. 17, 1918 |
| 1,814,212 | Glover | July 14, 1931 |
| 2,041,711 | Hetzer | May 26, 1936 |
| 2,055,254 | Hanney | Sept. 22, 1936 |
| 2,087,775 | Matheys | July 20, 1937 |
| 2,130,817 | Shaw | Sept. 20, 1938 |
| 2,165,884 | Chamberlin | July 11, 1939 |
| 2,225,407 | Bassett | Dec. 17, 1940 |
| 2,288,141 | Oliver | June 30, 1942 |
| 2,307,254 | Bassett | Jan. 5, 1943 |
| 2,331,897 | Dyer | Oct. 19, 1943 |
| 2,355,508 | Busi | Aug. 8, 1944 |
| 2,359,138 | Martin | Sept. 26, 1944 |